(12) United States Patent
Murphy et al.

(10) Patent No.: US 7,734,747 B2
(45) Date of Patent: Jun. 8, 2010

(54) DYNAMIC LOOKUP SERVICE IN A DISTRIBUTED SYSTEM

(75) Inventors: Brian T. Murphy, Milford, NH (US);
Robert W. Scheifler, Somerville, MA (US); Zane Pan, Lexington, MA (US);
James H. Waldo, Dracut, MA (US);
Ann M. Wollrath, Groton, MA (US);
Kenneth C. R. C. Arnold, Lexington, MA (US)

(73) Assignee: Oracle America, Inc., Redwood Shores, CA (US)

( * ) Notice: Subject to any disclaimer, the term of this patent is extended or adjusted under 35 U.S.C. 154(b) by 1280 days.

(21) Appl. No.: 10/669,692

(22) Filed: Sep. 25, 2003

(65) Prior Publication Data
US 2005/0102353 A1 May 12, 2005

Related U.S. Application Data

(60) Division of application No. 10/408,365, filed on Apr. 8, 2003, which is a division of application No. 09/915,645, filed on Jul. 27, 2001, now Pat. No. 6,604,127, which is a continuation of application No. 09/417,908, filed on Oct. 13, 1999, now abandoned, which is a continuation of application No. 09/044,931, filed on Mar. 20, 1998, now Pat. No. 6,185,611.

(60) Provisional application No. 60/076,048, filed on Feb. 26, 1998.

(51) Int. Cl.
*G06F 15/173* (2006.01)
(52) U.S. Cl. .................. 709/223; 709/203; 709/217
(58) Field of Classification Search .......... 709/200, 709/203, 217–219, 223, 238, 242, 245; 707/3, 707/104.1
See application file for complete search history.

(56) References Cited

U.S. PATENT DOCUMENTS 3,449,669 A   6/1969   Granqvist (Continued)

FOREIGN PATENT DOCUMENTS

DE   2 262 825 A   10/1992

(Continued)

OTHER PUBLICATIONS

Auto-ID Center, "Auto-ID Savant Specification 1.0," Version of Oct. 13, 2003 (58 pages).

(Continued)

*Primary Examiner*—Faruk Hamza
(74) *Attorney, Agent, or Firm*—Marsh Fischmann & Breyfogle LLP

(57) ABSTRACT

An improved lookup service is provided that allows for the dynamic addition and deletion of services. This lookup service allows for the addition and deletion of services automatically, without user intervention. As a result, clients of the lookup service may continue using the lookup service and its associated services while the updates occur. Additionally, the lookup service provides a notification mechanism that can be used by clients to receive a notification when the lookup service is updated. By receiving such a notification, clients can avoid attempting to access a service that is no longer available and can make use of new services as soon as they are added to the lookup service.

5 Claims, 15 Drawing Sheets

U.S. PATENT DOCUMENTS

| | | |
|---|---|---|
| 4,430,699 A | 2/1984 | Segarra et al. |
| 4,491,946 A | 1/1985 | Kryskow, Jr. et al. |
| 4,558,413 A | 12/1985 | Schmidt et al. |
| 4,567,359 A | 1/1986 | Lockwood |
| 4,713,806 A | 12/1987 | Oberlander et al. |
| 4,800,488 A | 1/1989 | Agrawal et al. |
| 4,809,160 A | 2/1989 | Mahon et al. |
| 4,819,233 A | 4/1989 | Delucia et al. |
| 4,823,122 A | 4/1989 | Mann et al. |
| 4,939,638 A | 7/1990 | Stephenson et al. |
| 4,956,773 A | 9/1990 | Saito et al. |
| 4,992,940 A | 2/1991 | Dworkin |
| 5,088,036 A | 2/1992 | Ellis et al. |
| 5,101,346 A | 3/1992 | Ohtsuki |
| 5,109,486 A | 4/1992 | Seymour |
| 5,187,787 A | 2/1993 | Skeen et al. |
| 5,218,699 A | 6/1993 | Brandle et al. |
| 5,253,165 A | 10/1993 | Leiseca et al. |
| 5,257,369 A | 10/1993 | Skeen et al. |
| 5,293,614 A | 3/1994 | Ferguson et al. |
| 5,297,283 A | 3/1994 | Kelly, Jr. et al. |
| 5,303,042 A | 4/1994 | Lewis et al. |
| 5,307,490 A | 4/1994 | Davidson et al. |
| 5,311,591 A | 5/1994 | Fischer |
| 5,319,542 A | 6/1994 | King, Jr. et al. |
| 5,327,559 A | 7/1994 | Priven et al. |
| 5,339,430 A | 8/1994 | Lundin et al. |
| 5,339,435 A | 8/1994 | Lubkin et al. |
| 5,341,477 A | 8/1994 | Pitkin et al. |
| 5,386,568 A | 1/1995 | Wold et al. |
| 5,390,328 A | 2/1995 | Frey et al. |
| 5,392,280 A | 2/1995 | Zheng |
| 5,423,042 A | 6/1995 | Jalili et al. |
| 5,440,744 A | 8/1995 | Jacobson et al. |
| 5,446,901 A | 8/1995 | Owicki et al. |
| 5,448,740 A | 9/1995 | Kiri et al. |
| 5,452,459 A | 9/1995 | Drury et al. |
| 5,455,952 A | 10/1995 | Gjovaag |
| 5,459,837 A | 10/1995 | Caccavale |
| 5,471,629 A | 11/1995 | Risch |
| 5,475,792 A | 12/1995 | Stanford et al. |
| 5,475,817 A | 12/1995 | Waldo et al. |
| 5,475,840 A | 12/1995 | Nelson et al. |
| 5,481,721 A | 1/1996 | Serlet et al. |
| 5,491,791 A | 2/1996 | Glowny et al. |
| 5,504,921 A | 4/1996 | Dev et al. |
| 5,506,984 A | 4/1996 | Miller |
| 5,511,196 A | 4/1996 | Shackelford et al. |
| 5,511,197 A | 4/1996 | Hill et al. |
| 5,524,244 A | 6/1996 | Robinson et al. |
| 5,544,040 A | 8/1996 | Gerbaulet |
| 5,548,724 A | 8/1996 | Akizawa et al. |
| 5,548,726 A | 8/1996 | Pett |
| 5,553,282 A | 9/1996 | Parrish et al. |
| 5,555,367 A | 9/1996 | Premerlani et al. |
| 5,555,427 A | 9/1996 | Aoe et al. |
| 5,557,798 A | 9/1996 | Skeen et al. |
| 5,560,003 A | 9/1996 | Nilsen et al. |
| 5,561,785 A | 10/1996 | Blandy et al. |
| 5,577,231 A | 11/1996 | Scalzi et al. |
| 5,592,375 A | 1/1997 | Salmon et al. |
| 5,594,921 A | 1/1997 | Pett |
| 5,603,031 A | 2/1997 | White et al. |
| 5,617,537 A | 4/1997 | Yamada et al. |
| 5,628,005 A | 5/1997 | Hurvig |
| 5,634,008 A | 5/1997 | Gaffaney et al. |
| 5,640,564 A | 6/1997 | Hamilton et al. |
| 5,644,720 A | 7/1997 | Boll et al. |
| 5,644,768 A | 7/1997 | Periwal et al. |
| 5,652,888 A | 7/1997 | Burgess |
| 5,655,148 A | 8/1997 | Richman et al. |
| 5,659,751 A | 8/1997 | Heninger |
| 5,664,110 A | 9/1997 | Green et al. |
| 5,664,111 A | 9/1997 | Nahan et al. |
| 5,664,191 A | 9/1997 | Davidson et al. |
| 5,666,493 A | 9/1997 | Wojcik et al. |
| 5,671,225 A | 9/1997 | Hooper et al. |
| 5,671,279 A | 9/1997 | Elgamal |
| 5,674,982 A | 10/1997 | Greve et al. |
| 5,675,796 A | 10/1997 | Hodges et al. |
| 5,675,797 A | 10/1997 | Chung et al. |
| 5,675,804 A | 10/1997 | Sidik et al. |
| 5,680,573 A | 10/1997 | Rubin et al. |
| 5,680,617 A | 10/1997 | Gough et al. |
| 5,682,534 A | 10/1997 | Kapoor et al. |
| 5,684,955 A | 11/1997 | Meyer et al. |
| 5,689,709 A | 11/1997 | Corbett et al. |
| 5,694,551 A | 12/1997 | Doyle et al. |
| 5,706,435 A | 1/1998 | Barbara et al. |
| 5,706,502 A | 1/1998 | Foley et al. |
| 5,710,887 A | 1/1998 | Chelliah et al. |
| 5,715,314 A | 2/1998 | Payne et al. |
| 5,721,825 A | 2/1998 | Lawson et al. |
| 5,721,832 A | 2/1998 | Westrope et al. |
| 5,724,540 A | 3/1998 | Kametani |
| 5,724,588 A | 3/1998 | Hill et al. |
| 5,727,048 A | 3/1998 | Hiroshima et al. |
| 5,727,145 A | 3/1998 | Nessett et al. |
| 5,729,594 A | 3/1998 | Klingman |
| 5,734,706 A | 3/1998 | Windsor et al. |
| 5,737,607 A | 4/1998 | Hamilton et al. |
| 5,742,768 A | 4/1998 | Gennaro et al. |
| 5,745,678 A | 4/1998 | Herzberg et al. |
| 5,745,695 A | 4/1998 | Gilchrist et al. |
| 5,745,703 A | 4/1998 | Cejtin et al. |
| 5,745,755 A | 4/1998 | Covey |
| 5,748,897 A | 5/1998 | Katiyar |
| 5,754,849 A | 5/1998 | Dyer et al. |
| 5,754,977 A | 5/1998 | Gardner et al. |
| 5,757,925 A | 5/1998 | Faybishenko |
| 5,758,077 A | 5/1998 | Danahy et al. |
| 5,758,083 A | 5/1998 | Singh et al. |
| 5,758,328 A | 5/1998 | Giovannoli |
| 5,758,344 A | 5/1998 | Prasad et al. |
| 5,761,507 A | 6/1998 | Govett |
| 5,761,656 A | 6/1998 | Ben-Shachar |
| 5,764,897 A | 6/1998 | Khalidi |
| 5,764,915 A | 6/1998 | Heimsoth et al. |
| 5,764,982 A | 6/1998 | Madduri |
| 5,768,524 A | 6/1998 | Schmidt |
| 5,768,532 A | 6/1998 | Megerian |
| 5,774,551 A | 6/1998 | Wu et al. |
| 5,774,729 A | 6/1998 | Carney et al. |
| 5,778,179 A | 7/1998 | Kanai et al. |
| 5,778,187 A | 7/1998 | Monteiro et al. |
| 5,778,228 A | 7/1998 | Wei |
| 5,778,368 A | 7/1998 | Hogan et al. |
| 5,784,560 A | 7/1998 | Kingdon et al. |
| 5,787,425 A | 7/1998 | Big |
| 5,787,431 A | 7/1998 | Shaughnessy |
| 5,790,548 A | 8/1998 | Sistanizadeh et al. |
| 5,790,677 A | 8/1998 | Fox et al. |
| 5,794,207 A | 8/1998 | Walker et al. |
| 5,799,173 A | 8/1998 | Gossler et al. |
| 5,802,367 A | 9/1998 | Held et al. |
| 5,805,805 A | 9/1998 | Civanlar et al. |
| 5,806,042 A | 9/1998 | Kelly et al. |
| 5,808,911 A | 9/1998 | Tucker et al. |
| 5,809,144 A | 9/1998 | Sirbu et al. |
| 5,809,507 A | 9/1998 | Cavanaugh, III |
| 5,812,819 A | 9/1998 | Rodwin et al. |
| 5,813,013 A | 9/1998 | Shakib et al. |
| 5,815,149 A | 9/1998 | Mutschler, III et al. |
| 5,815,709 A | 9/1998 | Waldo et al. |

| | | | | | | |
|---|---|---|---|---|---|---|
| 5,815,711 A | 9/1998 | Sakamoto et al. | | 6,032,151 A | 2/2000 | Arnold et al. |
| 5,818,448 A | 10/1998 | Katiyar | | 6,034,925 A | 3/2000 | Wehmeyer |
| 5,828,842 A | 10/1998 | Sugauchi et al. | | 6,041,351 A | 3/2000 | Kho |
| 5,829,022 A | 10/1998 | Watanabe et al. | | 6,044,381 A | 3/2000 | Boothby et al. |
| 5,832,219 A | 11/1998 | Pett | | 6,052,761 A | 4/2000 | Hornung et al. |
| 5,832,529 A | 11/1998 | Wollrath et al. | | 6,055,562 A | 4/2000 | Devarakonda et al. |
| 5,832,593 A | 11/1998 | Wurst et al. | | 6,058,381 A | 5/2000 | Nelson |
| 5,835,737 A | 11/1998 | Sand et al. | | 6,058,383 A | 5/2000 | Narasimhalu et al. |
| 5,842,018 A | 11/1998 | Atkinson et al. | | 6,061,699 A | 5/2000 | DiCecco et al. |
| 5,844,553 A | 12/1998 | Hao et al. | | 6,061,713 A | 5/2000 | Bharadhwaj |
| 5,845,090 A | 12/1998 | Collins, III et al. | | 6,067,575 A | 5/2000 | McManis et al. |
| 5,845,129 A | 12/1998 | Wendorf et al. | | 6,078,655 A | 6/2000 | Fahrer et al. |
| 5,850,442 A | 12/1998 | Muftic | | 6,085,030 A | 7/2000 | Whitehead et al. |
| 5,860,004 A | 1/1999 | Fowlow et al. | | 6,085,255 A | 7/2000 | Vincent et al. |
| 5,860,153 A | 1/1999 | Matena et al. | | 6,092,194 A | 7/2000 | Touboul |
| 5,864,862 A | 1/1999 | Kriens et al. | | 6,093,216 A | 7/2000 | Adl-Tabatabai et al. |
| 5,864,866 A | 1/1999 | Henckel et al. | | 6,101,528 A | 8/2000 | Butt |
| 5,872,928 A | 2/1999 | Lewis et al. | | 6,104,716 A | 8/2000 | Crichton et al. |
| 5,872,973 A | 2/1999 | Mitchell et al. | | 6,108,346 A | 8/2000 | Doucette et al. |
| 5,875,335 A | 2/1999 | Beard | | 6,119,122 A | 9/2000 | Bunnell |
| 5,878,411 A | 3/1999 | Burroughs et al. | | 6,134,603 A | 10/2000 | Jones et al. |
| 5,884,024 A | 3/1999 | Lim et al. | | 6,154,844 A | 11/2000 | Touboul et al. |
| 5,884,079 A | 3/1999 | Furusawa | | 6,157,960 A | 12/2000 | Kaminsky et al. |
| 5,887,134 A | 3/1999 | Ebrahim | | 6,182,083 B1 | 1/2001 | Scheifler et al. |
| 5,887,172 A | 3/1999 | Vasudevan et al. | | 6,185,602 B1 | 2/2001 | Bayrakeri |
| 5,889,951 A | 3/1999 | Lombardi | | 6,185,625 B1 * | 2/2001 | Tso et al. ............ 709/247 |
| 5,889,988 A | 3/1999 | Held | | 6,189,046 B1 | 2/2001 | Moore et al. |
| 5,890,158 A | 3/1999 | House et al. | | 6,192,044 B1 * | 2/2001 | Mack ............... 370/352 |
| 5,892,904 A | 4/1999 | Atkinson et al. | | 6,199,068 B1 | 3/2001 | Carpenter |
| 5,905,868 A | 5/1999 | Baghai et al. | | 6,199,116 B1 | 3/2001 | May et al. |
| 5,913,029 A | 6/1999 | Shostak | | 6,212,578 B1 | 4/2001 | Racicot et al. |
| 5,915,112 A | 6/1999 | Boutcher | | 6,216,138 B1 | 4/2001 | Wells et al. |
| 5,925,108 A | 7/1999 | Johnson et al. | | 6,216,158 B1 | 4/2001 | Luo et al. |
| 5,933,497 A | 8/1999 | Beetcher et al. | | 6,219,675 B1 | 4/2001 | Pal et al. |
| 5,933,647 A | 8/1999 | Aronberg et al. | | 6,226,746 B1 | 5/2001 | Scheifler |
| 5,935,249 A | 8/1999 | Stern et al. | | 6,243,716 B1 | 6/2001 | Waldo et al. |
| 5,940,504 A | 8/1999 | Griswold | | 6,243,814 B1 | 6/2001 | Matena |
| 5,940,827 A | 8/1999 | Hapner et al. | | 6,247,091 B1 | 6/2001 | Lovett |
| 5,944,793 A | 8/1999 | Islam et al. | | 6,253,256 B1 | 6/2001 | Wollrath et al. |
| 5,946,485 A | 8/1999 | Weeren et al. | | 6,263,350 B1 | 7/2001 | Wollrath et al. |
| 5,946,694 A | 8/1999 | Copeland et al. | | 6,263,379 B1 | 7/2001 | Atkinson et al. |
| 5,949,998 A | 9/1999 | Fowlow et al. | | 6,269,401 B1 | 7/2001 | Fletcher et al. |
| 5,951,652 A | 9/1999 | Ingrassia, Jr. et al. | | 6,272,559 B1 | 8/2001 | Jones et al. |
| 5,956,509 A | 9/1999 | Kevner | | 6,282,295 B1 | 8/2001 | Young et al. |
| 5,960,404 A | 9/1999 | Chaar et al. | | 6,282,568 B1 | 8/2001 | Sondur et al. |
| 5,961,582 A | 10/1999 | Gaines | | 6,282,581 B1 | 8/2001 | Moore et al. |
| 5,963,924 A | 10/1999 | Williams et al. | | 6,292,934 B1 | 9/2001 | Davidson et al. |
| 5,963,947 A | 10/1999 | Ford et al. | | 6,301,613 B1 | 10/2001 | Ahlstrom et al. |
| 5,966,435 A | 10/1999 | Pino | | 6,321,275 B1 | 11/2001 | McQuistan et al. |
| 5,966,531 A | 10/1999 | Skeen et al. | | 6,327,677 B1 | 12/2001 | Garg et al. |
| 5,969,967 A | 10/1999 | Aahlad et al. | | 6,339,783 B1 | 1/2002 | Horikiri |
| 5,974,201 A | 10/1999 | Chang et al. | | 6,343,308 B1 | 1/2002 | Marchesseault |
| 5,978,484 A | 11/1999 | Apperson et al. | | 6,351,735 B1 | 2/2002 | Deaton et al. |
| 5,978,773 A | 11/1999 | Hudetz et al. | | 6,360,266 B1 | 3/2002 | Pettus |
| 5,982,773 A | 11/1999 | Nishimura et al. | | 6,363,409 B1 | 3/2002 | Hart et al. |
| 5,987,506 A | 11/1999 | Carter et al. | | 6,378,001 B1 | 4/2002 | Aditham et al. |
| 5,991,808 A | 11/1999 | Broder et al. | | 6,385,643 B1 | 5/2002 | Jacobs et al. |
| 5,996,075 A | 11/1999 | Matena | | 6,408,342 B1 | 6/2002 | Moore et al. |
| 5,999,179 A | 12/1999 | Kekic et al. | | 6,418,468 B1 | 7/2002 | Ahlstrom et al. |
| 5,999,988 A | 12/1999 | Pelegri-Llopart et al. | | 6,463,480 B2 | 10/2002 | Kikuchi et al. |
| 6,003,050 A | 12/1999 | Silver et al. | | 6,496,865 B1 | 12/2002 | Sumsion et al. |
| 6,003,065 A | 12/1999 | Yan et al. | | 6,505,248 B1 | 1/2003 | Casper et al. |
| 6,003,763 A | 12/1999 | Gallagher et al. | | 6,564,174 B1 | 5/2003 | Ding et al. |
| 6,009,103 A | 12/1999 | Woundy | | 6,578,074 B1 | 6/2003 | Bahlmann |
| 6,009,413 A | 12/1999 | Webber et al. | | 6,603,772 B1 | 8/2003 | Moussavi et al. |
| 6,009,464 A | 12/1999 | Hamilton et al. | | 6,604,127 B2 | 8/2003 | Murphy et al. |
| 6,014,686 A | 1/2000 | Elnozahy et al. | | 6,604,140 B1 | 8/2003 | Beck et al. |
| 6,016,496 A | 1/2000 | Roberson | | 6,654,793 B1 | 11/2003 | Wollrath et al. |
| 6,016,516 A | 1/2000 | Horikiri | | 6,704,803 B2 | 3/2004 | Wilson et al. |
| 6,018,619 A | 1/2000 | Allard et al. | | 6,757,262 B1 | 6/2004 | Weisshaar et al. |
| 6,023,586 A | 2/2000 | Gaisford et al. | | 6,757,729 B1 | 6/2004 | Devarakonda et al. |
| 6,026,414 A | 2/2000 | Anglin | | 6,801,940 B1 | 10/2004 | Moran et al. |
| 6,031,977 A | 2/2000 | Pett | | 6,801,949 B1 | 10/2004 | Bruck et al. |

| | | | |
|---|---|---|---|
| 6,804,711 | B1 | 10/2004 | Dugan et al. |
| 6,804,714 | B1 | 10/2004 | Tummalapalli |
| 7,075,412 | B1 | 7/2006 | Reynolds et al. |
| 7,123,608 | B1 | 10/2006 | Scott et al. |
| 2001/0003824 | A1 | 6/2001 | Schnier |
| 2001/0011350 | A1 | 8/2001 | Zabetian |
| 2002/0059212 | A1 | 5/2002 | Takagi |
| 2002/0073019 | A1 | 6/2002 | Deaton |
| 2002/0099812 | A1 | 7/2002 | Davis et al. |
| 2002/0111814 | A1 | 8/2002 | Barnett et al. |
| 2003/0005132 | A1 | 1/2003 | Nguyen et al. |
| 2003/0033280 | A1 | 2/2003 | Van Den Hamer et al. |
| 2003/0084204 | A1 | 5/2003 | Wollrath et al. |
| 2003/0155415 | A1 | 8/2003 | Markham et al. |
| 2003/0191984 | A1 | 10/2003 | Flaherty et al. |
| 2004/0263319 | A1 | 12/2004 | Huomo |
| 2005/0027796 | A1 | 2/2005 | San Andres et al. |

FOREIGN PATENT DOCUMENTS

| | | |
|---|---|---|
| EP | 300 516 A2 | 1/1989 |
| EP | 351 536 A3 | 1/1990 |
| EP | 384 339 A3 | 8/1990 |
| EP | 472 874 A1 | 3/1992 |
| EP | 474 340 A2 | 3/1992 |
| EP | 497 022 A1 | 8/1992 |
| EP | 555 997 A2 | 8/1993 |
| EP | 565 849 A2 | 10/1993 |
| EP | 569 195 A3 | 11/1993 |
| EP | 625 750 A2 | 11/1994 |
| EP | 635 792 A2 | 1/1995 |
| EP | 651 328 A1 | 5/1995 |
| EP | 660 231 A2 | 6/1995 |
| EP | 697 655 A2 | 2/1996 |
| EP | 718 761 A1 | 6/1996 |
| EP | 767 432 A2 | 4/1997 |
| EP | 778 520 A2 | 6/1997 |
| EP | 794 493 A2 | 9/1997 |
| EP | 803 810 A2 | 10/1997 |
| EP | 803 811 A2 | 10/1997 |
| EP | 805 393 A2 | 11/1997 |
| EP | 810 524 A1 | 12/1997 |
| EP | 817 020 A2 | 1/1998 |
| EP | 817 022 A2 | 1/1998 |
| EP | 817 025 A2 | 1/1998 |
| EP | 836 140 A2 | 4/1998 |
| EP | 865 180 A2 | 9/1998 |
| EP | 892 530 A2 | 1/1999 |
| GB | 2 253 079 A | 8/1992 |
| GB | 2 262 825 A | 6/1993 |
| GB | 2 305 087 A | 3/1997 |
| JP | 7-168744 | 4/1995 |
| JP | 11-45187 | 2/1999 |
| WO | WO92/07335 | 4/1992 |
| WO | WO92/09948 | 6/1992 |
| WO | WO93/25962 A1 | 12/1993 |
| WO | WO94/03855 | 2/1994 |
| WO | WO96/03692 | 2/1996 |
| WO | WO96/10787 | 4/1996 |
| WO | WO96/18947 | 6/1996 |
| WO | WO96/24099 | 8/1996 |
| WO | WO98/02814 | 1/1998 |
| WO | WO98/04971 | 2/1998 |
| WO | WO 99/17194 | 4/1999 |
| WO | WO 01/13228 A2 | 2/2001 |
| WO | WO 01/86394 A2 | 11/2001 |
| WO | WO 01/90903 A1 | 11/2001 |

OTHER PUBLICATIONS

"Java™ Object Serialization Specification," Sun Microsystems, Inc. XP-002242372, www.dei.estg.iplei.pt/P3/N/material/extra/serial-spec-JDK1_2.pdf, Nov. 30 1998 (76 pages).

"Java.io ObjectInputStream," XP-002243027, The Java Class Libraries, $2^{nd}$ Edition, vol. 1, <java.sun.com/products/jdk/1.1/docs/guide/serialization/spec>, Mar. 9, 1998, pp. 1230-1232, 1263-1264 and 1283 (7 pages).

Java Remote Method Invocation Specification, JDK 1.1 FCS, Sun Microsystems, Inc. Feb. 1997, chapters 5 and 7 (96 pages).

Jennings, N.R. et al., "Using Intelligent Agents to Manage Business Processes," Dept. Electronic Engineering, Queen Mary & Westfield College, Mile End Road, London, E1 4NS, U.K., XP-002254546, 1996 (16 pages).

Opyrchal et al., "Efficient Object Serialization in Java," Department of Electrical Engineering and Computer Science, University of Michigan, XP-002242373, May 31, 1999 (6 pages).

Smith, H.A. et al., "Object-Oriented Technology: Getting Beyond the Hype," ACM, Spring 1996, vol. 27, pp. 20-29.

Administrator's Guide, Netscape Enterprise Server, Version 3.0, Netscape Communications Corp., 1998.

Agha et al., "Actorspaces: An Open Distributed Programming Paradigm," University of Illinois, Report No. UIUCDCS-R-92-1766, Open Systems Laboratory TR No. 8, pp. 1-12, Nov. 1992.

Ahmed et al., "A Program Building Tool for Parallel Applications," Yale University, pp. 1-23, Dec. 1, 1993.

Aldrich et al., "Providing Easier Access to Remote Objects in Client-Server Systems," System Sciences, 1998, Proceedings of the 31st Hawaii Internat'l. Conference, Jan. 6-9, 1998, pp. 366-375.

Aldrich et al., "Providing Easier Access to Remote Objects in Distributed Systems," Calif. Institute of Technology, www.cs.caltech.edu/%7Ejedi/paper/jedipaper.html, Nov. 21, 1997.

Alexander et al., "Active Bridging," Proceedings of the ACM/SIGCOMM'97 Conference, Cannes, France, Sep. 1997.

Almes et al., "Edmas: A Locally Distributed Mail System," Department of Computer Science, University of Washington, Technical Report 83-07-01, Jul. 7, 1983, Abstract & pp. 1-17.

Almes et al., "Research in Integrated Distributed Computing," Department of Computer Science, University of Washington, Oct. 1979, pp. 1-42.

Almes et al., "The Eden System: A Technical Review," Department of Computer Science, University of Washington, Technical Report 83-10-05, Oct. 1983, pp. 1-25.

Almes, "Integration and Distribution in the Eden System," Department of Computer Science, University of Washington, Technical Report 83-01-02, Jan. 19, 1983, pp. 1-18 & Abstract.

Almes, "The Evolution of the Eden Invocation Mechanism," Department of Computer Science, University of Washington, Technical Report 83-01-03, Jan. 19, 1983, pp. 1-14 & Abstract.

Anderson et al., "Persistent Linda: Linda + Transactions + Query Processing," Proceedings of the 13th Symposium on Fault Tolerant Systems, pp. 93-109, 1991.

Anonymo , "Change-Notification Service for Shared Files," IBM Technical Disclosure Bulletin, vol. 36, No. 8, pp. 77-82, XP002108713, New York, US, Aug. 1993.

Anonymo , "Resource Preemption for Priority Scheduling," IBM Technical Disclosure Bulletin, vol. 16, No. 6, p. 1931, XP002109435 New York, US , Nov. 1973.

Arnold, Ken, "The Jini Architecture: Dynamic Services in a Flexible Network," Sun Microsystems, Inc., Proceedings of the 36th ACM IEEE Design Automation Conference, Jun. 1999, pp. 157-162.

Bandrowski, "Stores Without Doors: Kiosks Generate New Profits," Corporate Computing, Oct. 1992, pp. 193-195.

Beech et al., "Object Databases as Generalizations of Relational Databases," Computer Standards & Interfaces, vol. 13, Nos. 1/3, pp. 221-230, Amsterdam, NL, Jan. 1991.

Begole et al., "Transparent Sharing of Java Applets: A Replicated Approach," Oct. 1997, pp. 55-65.

Bertino et al., "Object-Oriented Database Management Systems: Concepts and Issues," Computer, vol. 24, No. 4, pp. 33-47, Los Alamitos, CA, Apr. 1991.

Betz et al., "Interoperable Objects: Laying the Foundation for Distributed Object Computing," Dr. Dobb's Journal, vol. 19, No. 11, p. 18(13), Oct. 1994.

Bevan et al., "An Efficient Reference Counting Solution to the Distributed Garbage Collection Problem," Parallel Computing, NL, Elsevier Science Publishers, Amsterdam, vol. 9, No. 2, pp. 179-192, Jan. 1989.

Birrell et al., "Distributed Garbage Collection for Network Objects," Digital Systems Research Center, No. 116, pp. 1-18, Dec. 15, 1993.

Birrell et al., "Grapevine: An Exercise in Distributed Computing," Communications of the ACM, vol. 25, No. 4, pp. 260-274, Apr. 1982.

Birrell et al., "Implementing Remote Procedure Calls," ACM Transactions on Computer Systems, vol. 2, No. 1, pp. 39-59, Feb. 1984.

Birrell et al., "Network Objects," DEC SRC Research Report 115, Feb. 28, 1994.

Birrell et al., "Network Objects," Operating Systems Review, 27(5), pp. 217-230, Dec. 1993.

Black et al., "A Language for Distributed Programming," Department of Computer Science, University of Washington, Technical Report 86-02-03, Feb. 1986, p. 10.

Black et al., "Distribution and Abstract Types in Emerald," University of Washington, Technical Report No. 85-08-05, Aug. 1985, pp. 1-10.

Black et al., "Object Structure in the Emerald System," University of Washington, Technical Report 86-04-03, Apr. 1986, pp. 1-14.

Black et al., "The Eden Project: A Final Report," Department of Computer Science, University of Washington, Technical Report 86-11-01, Nov. 1986, pp. 1-28.

Black, "Supporting Distributed Applications: Experience with Eden," Department of Computer Science, University of Washington, Technical Report 85-03-02, Mar. 1985, pp. 1-21.

Black, "The Eden Programming Language," Department of Computer Science, FR-35, University of Washington, Technical Report 85-09-01, Sep. 1985 (Revised Dec. 1985), pp. 1-19.

Black, "The Eden Project: Overview and Experiences," Department of Computer Science, University of Washington, EUUG, Autumn '86 Conference Proceedings, Manchester, UK, Sep. 22-25, 1986, pp. 177-189.

Braine et al., "Object-Flow," 1997, pp. 418-419.

Bruno, "Working the Web," Data Communications, Apr. 1997, pp. 50-60.

Burns et al., "An Analytical Study of Opportunistic Lease Renewal," Distributed Computing Systems, 21st International Conference, pp. 146-153, Apr. 2000.

Cannon et al., "Adding Fault-Tolerant Transaction Processing to LINDA," Software-Practice and Experience, vol. 24(5), pp. 449-466, May 1994.

Cardelli, "Obliq, A Lightweight Language For Network Objects," Digital SRC, pp. 1-37, Nov. 5, 1993.

Carriero et al., "Distributed Data Structures in Linda," Principles of Programming Language, pp. 1-16,1986.

Carriero et al., "Distributed Data Structures in Linda," Yale Research Report YALEU/DCS/RR-438, Nov. 1985.

Chung et al., "A 'Tiny' Pascal Compiler: Part 1: The P-Code Interpreter," BYTE Publications, Inc., Sep. 1978.

Chung et al., "A 'Tiny' Pascal Compiler: Part 2: The P-Compiler," BYTE Publications, Inc., Oct. 1978.

Ciancarini et al., "Coordinating Distributed Applets with Shade/Java," Feb. 1998, pp. 130-138.

Cohen, "Electronic Commerce," C/Information Sciences Institute, Oct. 1989.

Conhaim, "Online shopping: a beginner's guide; includes related listing of videotex services," Link-Up, vol. 5, No. 6, p. 32, Nov. 1988.

"Consumers Can View, Share Picture On-Line as Kodak Picture Network Goes 'Live'," Business Wire, Aug. 25, 1997, pp. 18-19.

Coulouris et al., "Distributed Systems Concepts and Designs," Second Edition, Addison-Wesley, 1994.

Dave et al., "Proxies, Application Interface, And Distributed Systems," Proceedings International Workshop on Object Orientation in Operating Systems, pp. 212-220, Sep. 24, 1992.

Delcambre et al., "Simulation of the Object Flow Model: A Conceptual Modeling Language for Object-Driven Applications," 1993, pp. 216-225.

Design Project #2, Electronic Shopping at MIT, MIT Class 6.033 Handout 23, Massachusetts Institute of Technology, http://web.mit.edu/6.033/1995/handouts/html/h23.html, Spring 1995, pp. 1-6.

Deux et al., "The O2 System," Communications Of The Association For Computing Machinery, vol. 34, No. pp. 34-48, Oct. 1, 1991.

Dijkstra, "Self-stabilizing Systems in Spite of Distributed Control," Communications of the ACM, vol. 17, No. pp. 643-644, Nov. 1974.

Dolev et al., "On the Minimal Synchronism Needed for Distributed Consensus," Journal of the ACM, vol. 34, No. 1, pp. 77-97, Jan. 1987.

Dollimore et al., "The Design of a System for Distributing Shared Objects," The Computer Journal, No. 6, Cambridge, GB, Dec. 1991.

Dourish, "A Divergence-Based Model of Synchrony and Distribution in Collaborative Systems," Xerox Technical Report EPC-1194-102, pp. 1-10, 1994.

Drexler et al., "Incentive Engineering for Computational Resource Management," The Ecology of Computation, Elsevier Science Publishers B.V., pp. 231-266, 1988.

Droms, "RFC 1541 Dynamic Host Configuration Protocol," <http://www.cis.ohio-state.edu/htbin/rfc/rfc1541.html>, pp. 1-33, Oct. 1993.

"Eden Project Proposal," Department of Computer Science, University of Washington, Oct. 1980, Technical Report #80-10-01, cover and Foreword.

Ellsworth, "Boom Town," Internet World, Jun. 1995, pp. 33-35.

Emms, "A Definition Of An Access Control Systems Language," Computer Standards And Interfaces, vol. 6, No. 4, pp. 443-454, Jan. 1, 1987.

Estrin, "Inter-Organization Networks: Implications of Access Control Requirements for Interconnection Protocols," ACM, 1986, pp. 254-263.

Fleisch et al., "High Performance Distributed Objects Using Distributed Shared Memory & Remote Method Invocation," System Sciences, 1998, Proceedings of the 31st Hawaii Internat'l Conference, Jan. 6-9, 1998, pp. 574-578.

Fleischer, "SkyMall's 'Supplier Network' Takes Flight", Retailtech, The Technology Magazine for Retail Executives, Apr. 1997.

Foley, "Managing Camp -Wide Information Systems: Issues and Problems," Capitalizing on Communication, ACM SIGUCCS XVII, 1989, pp. 169-174.

Fryxell, "eaasySABRE," Link-Up, May/Jun. 1996, pp. 10-11.

Gardner, "Kodak Follows Startup Into Online Photo Processing Business," Internet World, Sep. 8, 1997, pp. 5-6.

Gelernter et al., "Parallel Programming in Linda," Yale University, pp. 1-21, Jan. 1985.

Gelernter, "Generative Communication in Linda," ACM Transactions on Programming Languages and Systems, vol. 7, No. 1, pp. 80-112, Jan. 1985.

Gogan et al., "Open Market, Inc.: Managing in a Turbulent Environment," Harvard Business School Publishing, Aug. 29, 1996, pp. 1-30.

Goldberg et al., "Smalltalk-80—The Language and its Implementation," Xerox Palo Alto Research Center, 1983 (reprinted with corrections, Jul. 1985), pp. 1-720.

Gosling et al., "The Java™ Language Specification," Addison-Wesley, 1996.

Gottlob et al., "Extending Object-Oriented Systems with Roles," ACM Transactions On Information Systems, vol. 14, No. 3, pp. 268-296, Jul. 1996.

Gray et al., "Leases: An Efficient Fault-Tolerant Mechanism for Distributed File Cache Consistency," ACM, pp. 202-210, 1989.

Gray et al., "Leases: An Efficient Fault-Tolerant Mechanism for Distributed File Cache Consistency," Proceedings of the 12th ACM Symposium on Operating Systems Principles, pp. 202-210, 1989.

Guth, "JavaOne: Sun to Expand Java Distributed Computing Effort," <http://www.sunworld.com/swol-02-1998/swol-02-sunspots.html>, XP-002109935, p. 1, Feb. 20, 1998.

Guyennet et al., "A New Consistency Protocol Implemented in the CAliF System," IEEE, 1094-7256/97, pp. 82-87, 1997.

Guyennet et al., "Distributed Shared Memory Layer for Cooperative Work Applications," IEEE, 0742-1303/97, pp. 72-78, 1997.

Hamilton et al., "Subcontract: A Flexible Base For Distributed Programming," Proceedings of 14th Symposium of Operating System Principles, Dec. 1993.

Hamilton, "Java and the Shift to Net-Centric Computing," Computer, pp. 31-39, Aug. 1996.

Harris et al., "Proposal for a General Java Proxy Class for Distributed Systems and Other Uses," Netscape Communications Corp., Jun. 25, 1997.

Hartman et al., "Liquid Software: A New Paradigm for Networked Systems," Technical Report 96-11, Department of Comp. Sci., Univ. of Arizona, Jun. 1996.

Hodges, Douglas, "Managing Object Lifetimes in OLE," Aug. 25, 1994, pp. 1-41.

Holman et al., "The Eden Shared Calendar System," Department of Computer Science, FR-35, University of Washington, Technical Report 85-05-02, Jun. 22, 1985, pp. 1-14.

Hoshi et al., "Allocation of the Cross-Connect Function in Leased Circuit Networks," 1992, ICC'92, conference record, SUPERCOMM/ICC '92, A New World of Communications, IEEE International Conference, pp. 1408-1412.

Howard et al., "Scale and Performance in a Distributed File System," ACM Transactions on Computer Systems, vol. 6, No. 1, pp. 51-81, Feb. 1988.

Hsu, "Reimplementing Remote Procedure Calls," University of Washington, Thesis, Mar. 22, 1985, pp. 1-106.

Hunt, "IDF: A Graphical Data Flow Programming Language for Image Processing and Computer Vision," Proceedings of the International Conference on Systems, Man, and Cybernetics, pp. 351-360, Los Angeles, Nov. 4-7, 1990.

Hutchinson, "Emerald: An Object-Based Language for Distributed Programming," a Dissertation, University of Washington, 1987, pp. 1-107.

IBM™ Technical Disclosure Bulletin, "Change Notification Service for Shared Files," Aug. 1993, vol. 36, pp. 77-82.

IBM™ Technical Disclosure Bulletin, "Object Location Algorithm," vol. 36, No. 09B, pp. 257-258, Sep. 1993.

IBM™ Technical Disclosure Bulletin, "Retrieval of Qualified Variables Using Extendible Hashing," vol. 36, No. 12, pp. 301-303, Dec. 1993.

IBM™ Technical Disclosure Bulletin, "Local Network Monitoring to Populate Access Agent Directory," vol. 36, No. 09A, pp. 403-405, Sep. 1993.

IBM, "Chapter 6—Distributed SOM (DSOM)," SOMobjects Developer Toolkit Users Guide, Version 2.1, pp. 6-1-6-90, Oct. 1994.

"ISN Dataweb Sells Software, Hardware," Datamation, Apr. 1, 1996, p. 40.

Israel et al., "Authentication in Office System Internetworks," ACM Transactions on Office Information Systems, vol. 1, No. 3, Jul. 1983, pp. 193-210.

Jacob, "The Use of Distributed Objects and Dynamic Interfaces in a Wide-Area Transaction Environment," SIGCOMMn '95 Workshop on Middleware: Cambridge, Mass., Aug. 1995, pp. 1-3.

"Java™ Remote Method Invocation Specification," Sun Microsystems, Inc., <java.sun.com/products/jdk1.2beta1>, 1997.

Jaworski, "Java 1.1 Developer's Guide, 2nd Edition," Sams.net, 1997.

Jones et al., "Garbage Collection: Algorithms for Automatic Dynamic Memory Management," pp. 165-175, John Wiley & Sons, 1996.

Jul et al., "Fine-Grained Mobility in the Emerald System," University of Washington, ACM Transactions on Computer Systems, vol. 6, No. 1, Feb. 1988, pp. 109-133.

Jul, "Object Mobility in a Distributed Object-Oriented System," a Dissertation, University of Washington, 1989, pp. 1-154 (1 page Vita).

Kambhatla et al., "Recovery with Limited Replay: Fault-Tolerant Processes in Linda," Oregon Graduate Institute, Technical Report CSIE 90-019, pp. 1-16, Sep. 1990.

Kay et al., "An Overview of the Raleigh Object-Oriented Database System," ICL Technical Journal, vol. 7, No. 4, pp. 780-798, Oxford, GB, Nov. 1991.

Keller, "Smart Catalogs and Virtual Catalogs," Proceedings of the First USENIX Workshop of Electronic Commerce, USENIX Association, Jul. 11-12, 1995, pp. 125-131.

Klein et al., "TRADE'ex: The Stock Exchange of the Computer Industry," Harvard Business School Publishing, 1996, pp. 1-14.

"Kodak DC220 and DC260 Digital Cameras Are Shipping To Retailers Across The Country Cameras Are Optimized for USB Interface Supported in Windows 98," Business Wire, Jun. 24, 1998, pp. 42-44.

"Kodak demonstrates leadership across entire photographic category," M2 Presswire, Feb. 13, 1998, pp. 31-35.

"Kodak PhotoNet Online Makes It a Snap to Share Summer Photos," PR Newswire, Jul. 2, 1998, pp. 63-64.

Kodak Photonet FAQ, PhotoNet Online, Jun. 14, 2002, pp. 1-3.

"Kodak Picture Network Sends Prints Home From the Holidays," Business Wire, Dec. 29, 1997, pp. 58-60.

Kolodner et al., "Atomic Garbage Collection: Managing a Stable Heap," ACM, 1989, pp. 15-25.

Koshizuka et al., "Window Real-Objects: A Distributed Shared Memory for Distributed Implementation of GUI Applications," Nov. 1993, pp. 237-247.

Kougiouris et al., "Support for Space Efficient Object Invocation in Spring," Sep. 1994.

Kramer, "NETWATCH; The AJC's Daily Online Guide; Get the picture: Kodak will send photos to Web," The Atlanta Journal and Constitution, Sec. Features, p. 08C, Jun. 5, 1997.

Krasner et al., "Smalltalk-80: Bits of History, Words of Advice," 1983, Xerox Corporation, pp. 1-344.

Krasner, "The Smalltalk-80 Virtual Machine," BYTE Publications Inc., pp. 300-320, Aug. 1991.

Lamport et al., "The Byzantine Generals Problem," ACM Transactions on Programming Languages and Systems, vol. 4, No. 3, pp. 382-401, Jul. 1982.

Lampson et al., "Authentication in Distributed Systems: Theory and Practice," ACM Transactions n Computer Systems, vol. 10, No. 4, Nov. 1992, pp. 265-310.

Lansky, "Without APS, Photo Life Goes on Via Internet," Photographic Trade News, Aug. 1996, pp. 19-23.

Lavana et al., "Executable Workflows: A Paradigm for Collaborative Design on the Internet," Jun. 1997, 6 pages.

Lewis, "Pacific Bell, MCI to Expand Internet Service," The New York Times, sec. D, col. 1 at 3, Mar. 28, 1995.

LightSurf Instant Imaging—Press Releases, "Kodak and LightSurf Collaborate On Kodak Picture Center Online," LifeSurf Technologies Inc., Jun. 14, 2002, pp. 1-3.

Linda Database Search, pp. 1-68, Jul. 20, 1995.

Lindholm et al., "The Java™ Virtual Machine Specification," Addison Wesley, 1996.

Liskov et al., "Distributed Object Management in Thor," International Workshop on Distributed Object Management, p. 12, 1992.

Louwerse et al., "Data Protection Aspects in an Integrated Hospital Information System," North-Holland Computers & Security 3, 1984, pp. 286-294.

McDaniel, "An Analysis of a Mesa Instruction Set," Xerox Corporation, May 1982.

McEnaney, "Point-and-Click Memory Sharing; Launches PhotoNet online digital photography and imaging services, " Photographic Trade News, Sec. p. 23, Jan. 1997.

McGrath, "Discovery and Its Discontents: Discovery Protocols for Ubiquitous Computing," Presented at Center for Excellence in Space Data and Information Science, NASA Goddard Space Flight Center, Apr. 5, 2000.

Miller, "Web posting as a photo processing option," USA Today, Section: Life, p. 17D, Dec. 13, 1996.

Mitchell et al., "An Overview of the Spring System," Feb. 1994.

Mitchell et al., "Mesa Language Manual," Xerox Corporation, Palo Alto Research Center, 1978.

Morris et al., "Andrew: A Distributed Personal Computing Environment," Communications of the ACM, vol. 29, No. 3, Mar. 1986, pp. 184-201.

Mullender, "Distributed Systems," Second Edition, Addison-Wesley, 1993.

Mummert et al., "Long Term Distributed File Reference Tracing: Implementation and Experience," Carnegie Mellon University School of Computer Science, pp. 1-28, Nov. 1994.

MUX-Elektronik, Java 1.1 Interactive Course, www.lls.se/~mux/javaic.html, 1995.

O'Mahony, "Security Considerations in a Network Management Environment," IEEE Network, May/Jun. 1994, pp. 12-17.

Oppen et al., "The Clearinghouse: A Decentralized Agent for Locating Names Objects in a Distributed Environment," ACM Transactions on Office Information Systems, vol. 1, No. 3, Jul. 1983, pp. 230-253.

Orfali et al., "The Essential Distributed Objects Survival Guide," Chapter 11: Corba Commercial ORBs, pp. 203-215, John Wiley & Sons, Inc., 1996.

Osborn, "The Role of Polymorphism in Schema Evolution in an Object-Oriented Database," IEEE Transactions on Knowledge and Data Engineering, vol. 1, No. 3, Sep. 1989, pp. 310-317.

Oterhout et al., "The Sprite Network Operating System," Computer, IEEE, pp. 23-36, Feb. 1988.

Petersen, "New But Not Improved, " Direct Magazine, Nov. 1995.

"Photo processing made easy on the Internet; Storm Software and PictureVision team up with Konica Corp.," Business Wire, Feb. 22, 1996, pp. 3-4.

Pier, "A Retrospective on the Dorando, A High-Performance Personal Computer," IEEE Conference Proceedings, The 10th Annual International Symposium on Computer Architecture, 1983.

Pier, "A Retrospective on the Dorando, A High-Performance Personal Computer," Xerox Corporation, Aug. 1983.

Pinakis, "Using Linda as the Basis of an Operating System Microkernel," University of Western Australia, Department of Computer Science, pp. 1-165, Aug. 1993.

Press Release, "Sun Goes Live With The Kodak Picture Network," Sun Microsystems, Inc., Jun. 14, 2002, pp. 1-2.

Proceedings of the Eighth Symposium on Operating Systems Principles, Dec. 14-16, 1981, ACM, Special Interest Group: 2157on Operating Systems, Association for Computing Machinery, vol. 15, No. 5, Dec. 1981, ACM Order No. 534810.

Proudfoot, "Replets: Data Replication in the Eden System," Department of Computer Science, University of Washington, Technical Report No. TR-85-12-04, Dec. 1985, pp. 1-156.

Pu, "Replication and Nested Transaction in the Eden Distributed System," Doctoral Dissertation, University of Washington, Aug. 6, 1986, pp. 1-179 (1 page Vita).

Raeder, "Is there a Prodigy in your future?," Database Searcher, vol. 5, No. 6, pg. 18, Jun. 1989.

Ramm et al., "Exu—A System for Secure Delegation of Authority on an Insecure Network," Ninth System Administration Conference, 1995 LISA IX, Sep. 17-22, 1995, pp. 89-93.

Riggs et al., "Pickling State in the Java™ System," USENIX Association Conference on Object-Oriented Technologies and Systems, XP-002112719, pp. 241-250, Jun. 17-21, 1996.

Rosenberry et al., "Understanding DCE," Chapters 1-3, 6, 1992.

Sandholm et al., "Design of Object Caching in a CORBA OTM System" (Jun. 11, 1989).

Sandholm, "Object Caching in a Transactional, Object-Relational CORBA Environment," Dept. of Computer and Systems Sciences, University of Stockholm (Oct. 1998).

Satyanarayanan, "Integrating Security in a Large Distributed System," ACM Transactions on Computer Systems, vol. 7, No. 3, Aug. 1989, pp. 247-280.

Schroeder et al., "Experience with Grapevine: The Growth of a Distributed System," ACM Transactions on Computer Systems, vol. 2, No. 1, Feb. 1984, pp. 3-23.

"Seeing your photos a whole new way," Business Wire, Dec. 12, 1996, pp. 9-10.

Senn, "Capitalizing on Electronic Commerce: The Role of the Internet in Electronic Markets," Information Systems Management, Summer 1996, pp. 15-24.

Sharrott et al., "ObjectMap: Integrating High Performance Resources into a Distributed Object-oriented Environment," ICODP, 1995.

Steinke, "Design Aspects of Access Control in a Knowledge Base System," Computers & Security, 10, 1991, pp. 612-625.

Stern, "Industry Net," Link-Up, Mar./Apr. 1995, p. 10.

Stevenson, "Token-Based Consistency of Replicated Servers," IEEE, CH2686-4/89/0000/0179, pp. 179-183, 1989.

Sun Microsystems, "Jini™ Discovery and Join Specification," Jini Specifications 1.0 (Jan. 25, 1999).

Sun Microsystems, "Jini™ Architectural Overview," Technical White Paper (Jan. 1999).

Sun Microsystems, "Jini™ Distributed Event Specification," Jini 1.0 Specifications (Jan. 25, 1999).

Sun Microsystems, "Jini™ Lookup Service Specification," Jini 1.0 Specifications (Jan. 25, 1999).

Tanenbaum et al., "Distributed Operating Systems," Computing Surveys, vol. 17, No. 4, Dec. 1985, pp. 419-470.

The Wall Street Journal, "Barclays Is Opening an 'Electronic Mall' For Internet Shopping," Tech. & Health Section at B2, Jun. 1, 1995.

The Wall Street Journal, "Prodigy Plans to Announce Internet 'Electronic Mail'," Tech. Section at B5, Nov. 27, 1995.

Thompson, "Regular Expression Search Algorithm," Communications of the ACM, vol. II, No. 6, p. 149 et seq., Jun. 1968.

"Transparent Network Computing," Locus Computing Corporation, Jan. 5, 1995.

Trehan et al., "Toolkit for Shared Hypermedia on a Distributed Object Oriented Architecture," 1993, pp. 1-8.

Trommer, "Thomas Unveils Online Purchasing Network—Eases Product Sourcing And Ordering Through EDI," Electronic Buyers' News at 60, Dec. 11, 1995.

Van Den Berg et al., "Advanced Topics of a Computer Center Audit," North-Holland Computers & Security 3, 1984, pp. 171-185.

Van Der Lans, "Data Security in a Relational Database Environment," North-Holland Computers & Security 5, 1986, pp. 128-134.

Venners, "Jini Technology, Out of the Box," JAVAWORLD, 'Online!, pp. 1-4, Dec. 1998.

"FAQ and Links to Resources," Jini-Users Mailing List Archives (Apr. 30, 1999).

Waldo et al., "Events in an RPC Based Distributed System," Proceedings Of The 1995 ENIX Technical Conference, Proceedings USENIX Winter 1995 Technical Conference, New Orleans, LA, A, 16-20, pp. 131-142, Jan. 1995.

"Webwatch: MCI Announces Internet Access," Boardwatch Magazine, Jan. 1995.

Welz, "New Deals: a ripening Internet market, secure systems and digital currency are reshaping global commerce," Internet World, Jun. 1995, pp. 36-41.

Wilson et al., "Design of the Opportunistic Garbage Collector," Proceedings of the Object Oriented Programming Systems Languages and Applications Conference, New Orleans, vol. 24, No. 10, Oct. 1989.

Wobber et al., "Authentication in the Taos Operating System," ACM, 1993, pp. 256-269.

Wollrath et al., "A Distributed Object Model for the Java™ System," USENIX Association, Conference on Object-Oriented Technologies and Systems, Jun. 17-21, 1996.

Wu, "A Type System For An Object-Oriented Database System," Proceedings of the International Computer Software and Applications Conference (COMPSAC), Tokyo, Japan, pp. 333-338, Sep. 11-13, 1991.

Wyatt, "Netscape Enterprise Server," Prima Publishing, 1996.

Yemini et al., "Towards Programmable Networks," IFIP/IEEE International Workshop on Distributed Systems: Operations and Management, L'Aquila, Italy, Oct. 1996.

Yin et al., "Using Leases to Support Server Driven Consistency in Large-Scale Systems," Computer Services Department, University of Texas at A tin, p. 285-294, May 26-28, 1998.

Yin et al., "Volume Leases for Consistency in Large-Scale Systems," IEEE Transactions on Knowledge & Data Engineering, vol. 11, No. 4, pp. 563-576, Jul./Aug. 1999.

Amitabh, D., et al., Proxies, Application Interfaces, and Distributed Systems, IEEE, pp. 212-220, 1992.

Li, Sing et al., "Professional Jini", Chapter 7, Aug. 2000.

Spiteri, M.D., et al., "An architecture to support storage and retrieval of events", 1998.

"Dynamic code downloading using RMI," http://java.sun.com/j2se/1.4.2/docs/guide/mi/codebase.html, 2003 (9 pages).

"Passing Proxies as Parameters to Methods and Return Values from Methods," IBM Technical Disclosure Bulletin, vol. 41, No. 1, Jan. 1998, pp. 89-92. (4 pages).

"Jini Distributed Leasing Specification," Sun Microsystems, Jan. 1999, XP-002209076. (26 pages).

Subramanian, Sakthi et al., "Automatic Verification of Object Code Against Source Code," IEEE, 1996, pp. 46-55. (24 pages).

Wollrath, A., et al., "Simple Activation for Distributed Objects," USENIX Association, Conference on Object-Oriented Technologies (COOTS), Jun. 26-29, 1995. (11 pages).

Stoyenko, A.D. "SUPRA-RPC: SUbprogram PaRAmeters in Remote Procedure Calls," *Software-Practice and Experience*, vol. 24(1), pp. 27-49, 1994. (24 pages).

Lemay, Laura, et al. "Teach Yourself Java in 21 Days, Professional Reference Edition", 1996, SAMS.NET Publishing.

Plainfosse, D., et al., "A Survey of Distributed Garbage Collection Techniques", http://citeseer.nj.nec.com/plainfosse95survey.html, Sep. 1995, pp. 1-33, XP002126410.

* cited by examiner

DYNAMIC LOOKUP SERVICE IN A DISTRIBUTED SYSTEM

This is a divisional of application Ser. No. 10/408,365, filed Apr. 8, 2003, which is a divisional of application Ser. No. 09/915,645, filed Jul. 27, 2001, now U.S. Pat. No. 6,604,127, issued Aug. 5, 2003, which is a continuation of application Ser. No. 09/417,908, filed Oct. 13, 1999, now abandoned, which is a continuation of application Ser. No. 09/044,931, filed Mar. 20, 1998, issued as U.S. Pat. No. 6,185,611, which claims the benefit of U.S. Provisional Application No. 60/076,048, filed Feb. 26, 1998, all of which are incorporated herein by reference.

RELATED APPLICATIONS

This application is a continuation-in-part of U.S. patent application Ser. No. 09/044,931, filed on Mar. 20, 1998, which is incorporated by reference.

The following identified U.S. patents and patent applications are relied upon and are incorporated by reference in this application.

U.S. Provisional Application No. 60/138,680, entitled "Jini™ Technology Helper Utilities and Services," filed on Jun. 14, 1999.

U.S. Provisional Application No. 60/076,048, entitled "Distributed Computing System." filed on Feb. 26, 1998.

U.S. patent application Ser. No. 09/044,923, now U.S. Pat. No. 6,263,350, entitled "Method and System for Leasing Storage."

U.S. patent application Ser. No. 09/044,838, now U.S. Pat. No. 6,247,026, entitled "Method. Apparatus and Product for Leasing of Delegation Certificates in a Distributed System."

U.S. patent application Ser. No. 09/044,834, now U.S. Pat. No. 6,421,704, entitled "Method. Apparatus and Product for Leasing of Group Membership in a Distributed System."

U.S. patent application Ser. No. 09/044,933, now U.S. Pat. No. 6,463,446, entitled "Method for Transporting Behavior in Event Based System."

U.S. patent application Ser. No. 09/044,919, now U.S. Pat. No. 6,272,559, entitled "Deferred Reconstruction of Objects and Remote Loading for Event Notification in a Distributed System."

U.S. patent application Ser. No. 09/045,652, now U.S. Pat. No. 6,134,603, entitled "Method and System for Deterministic Hashes to Identify Remote Methods."

U.S. patent application Ser. No. 09/044,790, now U.S. Pat. No. 6,598,094, entitled "Method and Apparatus for Determining Status of Remote Objects in a Distributed System."

U.S. patent application Ser. No. 09/044,930, now U.S. Pat. No. 6,393,497, entitled "Downloadable Smart Proxies for Performing Processing Associated with a Remote Procedure Call in a Distributed System."

U.S. patent application Ser. No. 09/044,917, now U.S. Pat. No. 6,237,024, entitled "Method and Apparatus for the Suspension and Continuation of Remote Processes."

U.S. patent application Ser. No. 09/044,835, now U.S. Pat. No. 6,182,083, entitled "Method and System for Multi-Entry and Multi-Template Matching in a Database."

U.S. patent application Ser. No. 09/044,839, entitled "Method and System for In-Place Modifications in a Database," now abandoned.

U.S. patent application Ser. No. 09/044,945, now U.S. Pat. No. 6,578,044, entitled "Method and System for Typesafe Attribute Matching in a Database."

U.S. patent application Ser. No. 09/044,939, now U.S. Pat. No. 6,560,656, entitled "Apparatus and Method for Providing Downloadable Code for Use in Communicating with a Device in a Distributed System," filed Mar. 20, 1998.

U.S. patent application Ser. No. 09/044,826, entitled "Method and System for Facilitating Access to a Lookup Service," filed Mar. 20, 1998.

U.S. patent application Ser. No. 09/044,932, now U.S. Pat. No. 6,466,947, entitled "Apparatus and Method for Dynamically Verifying Information in a Distributed System."

U.S. patent application Ser. No. 09/030,840, now U.S. Pat. No. 6,446,070, entitled "Method and Apparatus for Dynamic Distributed Computing Over a Network."

U.S. patent application Ser. No. 09/044,936, entitled "An Interactive Design Tool for Persistent Shared Memory Spaces," now abandoned.

U.S. patent application Ser. No. 09/044,934, now U.S. Pat. No. 6,438,614, entitled "Polymorphic Token-Based Control."

U.S. patent application Ser. No. 09/044,915, now U.S. Pat. No. 6,138,238, entitled "Stack-Based Access Control."

U.S. patent application Ser. No. 09/044,944, now U.S. Pat. No. 6,226,746, entitled "Stack-Based Security Requirements."

U.S. patent application Ser. No. 09/044,837, now U.S. Pat. No. 6,282,652, entitled "Per-Method Designation of Security Requirements."

FIELD OF THE INVENTION

The present invention relates generally to data processing systems and, more particularly, to a dynamic lookup service in a distributed system.

BACKGROUND OF THE INVENTION

A lookup service contains an indication of where network services are located within a distributed system comprised of multiple machines, such as computers and related peripheral devices, connected in a network (for example, a local area network, wide area network, or the Internet). A "network service" refers to a resource, data, or functionality that is accessible on the network. Typically, for each service, the lookup service contains an address used by a client (e.g., a program) to access the service (e.g., a printer).

Conventional lookup services are static: whenever updates to the lookup service are needed to either add a new service or delete an existing service, the lookup service is taken offline, rendering the lookup service inaccessible, and then, the lookup service is manually updated by the system administrator. During the time when the lookup service is offline, clients in the distributed system are unable to access the lookup service and any of its network services. Another limitation of conventional lookup services is that, when updated, clients are not made aware of the updates to the lookup service until they explicitly perform a refresh operation, which downloads the latest service information to the clients. Before such a refresh, however, if a client requests a service that is no longer available, an error occurs which may cause the client to hang. Also, before a refresh, the client is not aware of any new services that have been recently added to the lookup service. It is therefore desirable to improve lookup services for distributed systems.

SUMMARY OF THE INVENTION

Systems consistent with the present invention provide an improved lookup service that allows for the dynamic addition and deletion of services. This lookup service allows for the update, i.e., addition and deletion of available services automatically, without user intervention. As a result, clients of the lookup service may continue using the lookup service and its associated services while the updates occur. Additionally, the lookup service provides a notification mechanism that can be used by clients to receive a notification when the lookup service is updated. By receiving such a notification, clients can avoid attempting to access a service that is no longer available and can make use of new services as soon as they are added to the lookup service.

In accordance with methods consistent with the present invention, a method is provided in a data processing system having a lookup service with associated services. This method receives a request by the lookup service for notification when the lookup service is updated, determines when the lookup service is updated, and generates a notification when it is determined that the lookup service is updated.

In accordance with methods consistent with the present invention, a method is provided in a data processing system having a lookup service with associated services. This method sends a request to the lookup service to be notified when the lookup service is updated and receives an indication that the lookup service has been updated.

In accordance with methods consistent with the present invention, a method is provided in a data processing system having a lookup service with associated services and a client lookup manager with an associated cache. This method transmits an event by the lookup service that identifies a change to one of the associated network services. The client lookup manager receives the event and updates the associated cache to reflect the change.

In accordance with methods consistent with the present invention, a method is provided in a data processing system having a client and lookup service with associated services. This method receives a request from a client for access to a network service, then retrieves a reference from a cache reflecting a particular network service corresponding to the requested network service and transmits the reference to the client.

In accordance with systems consistent with the present invention, a data processing system comprising a memory and a processor is provided. The memory includes a lookup service containing indications of services that are available for use, a first client for updating the lookup service, and a second client for utilizing the lookup service while the first client is updating the lookup service. The processor runs the lookup service, the first client, and the second client.

In accordance with systems consistent with the present invention, a data processing system containing a memory and a processor is provided. The memory contains a lookup service with indications of services available for use and a client. The lookup service receives requests for notification of when the lookup service is updated, determines when the lookup service is updated, and generates notifications when the lookup service is updated. The client sends a request to the lookup service to be notified when the lookup service is updated. The processor runs the client and the lookup service.

In accordance with systems consistent with the present invention, a data processing system containing a memory and a processor is provided. The memory contains a lookup service with references to a plurality of network services available for use, a client, and a client lookup manager with an associated cache stored on the client computer. The client lookup manager accesses the lookup service and stores service references in the cache. The processor runs the client and the lookup service.

In accordance with systems consistent with the present invention, a computer-readable memory device containing a data structure is provided. This data structure is for accessing a lookup service with associated network services available for use. The data structure contains a notify method for use by a client to register with the lookup service to receive a notification from the lookup service when the lookup service is updated.

BRIEF DESCRIPTION OF THE DRAWINGS

The accompanying drawings, which are incorporated in and constitute a part of this specification, illustrate an implementation of the invention and, together with the description, serve to explain the advantages and principles of the invention. In the drawings.

DETAILED DESCRIPTION OF THE INVENTION

Figure 1:
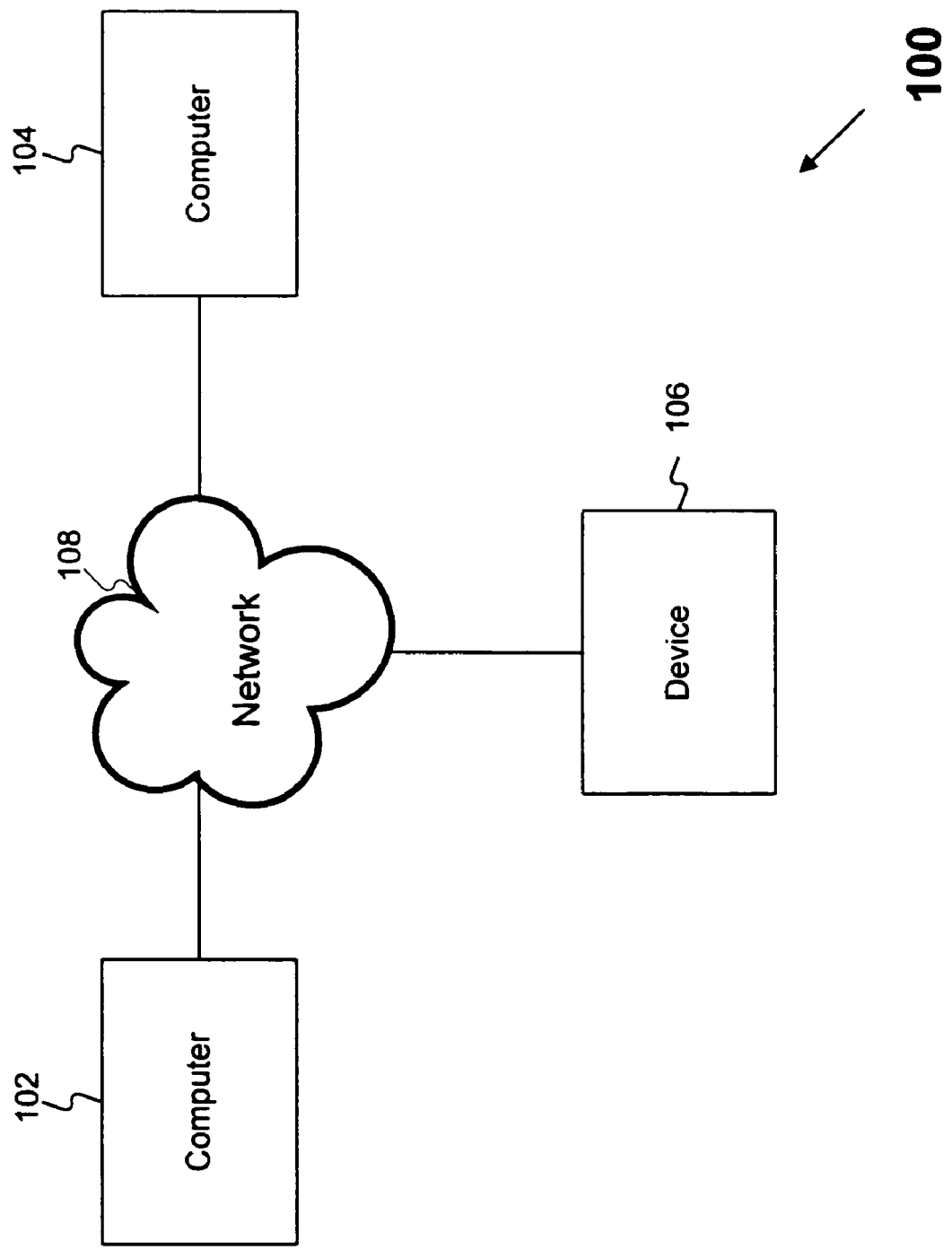
FIG. 1 depicts a distributed system suitable for practicing methods and systems consistent with the present invention.

Methods and systems consistent with the present invention provide an improved lookup service that allows for the dynamic addition and deletion of services. As such, the addition and deletion of services is performed automatically, without user intervention, and clients of the lookup service may continue using the services while the updates to the lookup service occur. Additionally, clients may register with the lookup service to receive notification of when the lookup service is updated. As a result, when an update occurs, all registered clients receive a notification of the update, enabling the clients to avoid attempting to access a service that is no longer available and to use a service recently added to the lookup service.

Overview of the Distributed System

Methods and systems consistent with the present invention operate in a distributed system ("the exemplary distributed system") with various components, including both hardware and software. The exemplary distributed system (1) allows users of the system to share services and resources over a network of many devices; (2) provides programmers with tools and programming patterns that allow development of robust, secured distributed systems; and (3) simplifies the task of administering the distributed system. To accomplish these goals, the exemplary distributed system utilizes the Java™ programming environment to allow both code and data to be moved from device to device in a seamless manner. Accordingly, the exemplary distributed system is layered on top of the Java programming environment and exploits the characteristics of this environment, including the security offered by it and the strong typing provided by it. The Java programming environment is more clearly described in Jaworski, *Java 1.1 Developer's Guide*, Sams.net (1997), which is incorporated herein by reference.

In the exemplary distributed system, different computers and devices are federated into what appears to the user to be a single system By appearing as a single system, the exemplary distributed system provides the simplicity of access and the power of sharing that can be provided by a single system without giving up the flexibility and personalized response of a personal computer or workstation. The exemplary distributed system may contain thousands of devices operated by users who are geographically disperse, but who agree on basic notions of trust, administration, and policy. Within the exemplary distributed system are various logical groupings of services provided by one or more devices, and each such logical grouping is known as a Djinn. A "service" refers to a resource, data, or functionality that can be accessed by a user, program, device, or another service and that can be computational, storage related, communication related, or related to providing access to another user. Examples of services provided as part of a Djinn include devices, such as printers, displays, and disks; software, such as applications or utilities; information, such as databases and files; and users of the system.

Both users and devices may join a Djinn. When joining a Djinn, the user or device adds zero or more services to the Djinn and may access, subject to security constraints, any one of the services it contains. Thus, devices and users federate into a Djinn to share access to its services. The services of the Djinn appear programmatically as objects of the Java programming environment, which may include other objects, software components written in different programming languages, or hardware devices. A service has an interface defining the operations that can be requested of that service, and the type of the service determines the interfaces that make up that service.

FIG. 1 depicts the exemplary distributed system 100 containing a computer 102, a computer 104, and a device 106 interconnected by a network 108. The device 106 may be any of a number of devices, such as a printer, fax machine, storage device, input device, computer, or other devices. The network 108 may be a local area network, wide area network, or the Internet. Although only two computers and one device are depicted as comprising the exemplary distributed system 100, one skilled in the art will appreciate that the exemplary distributed system 100 may include additional computers or devices.

Figure 2:
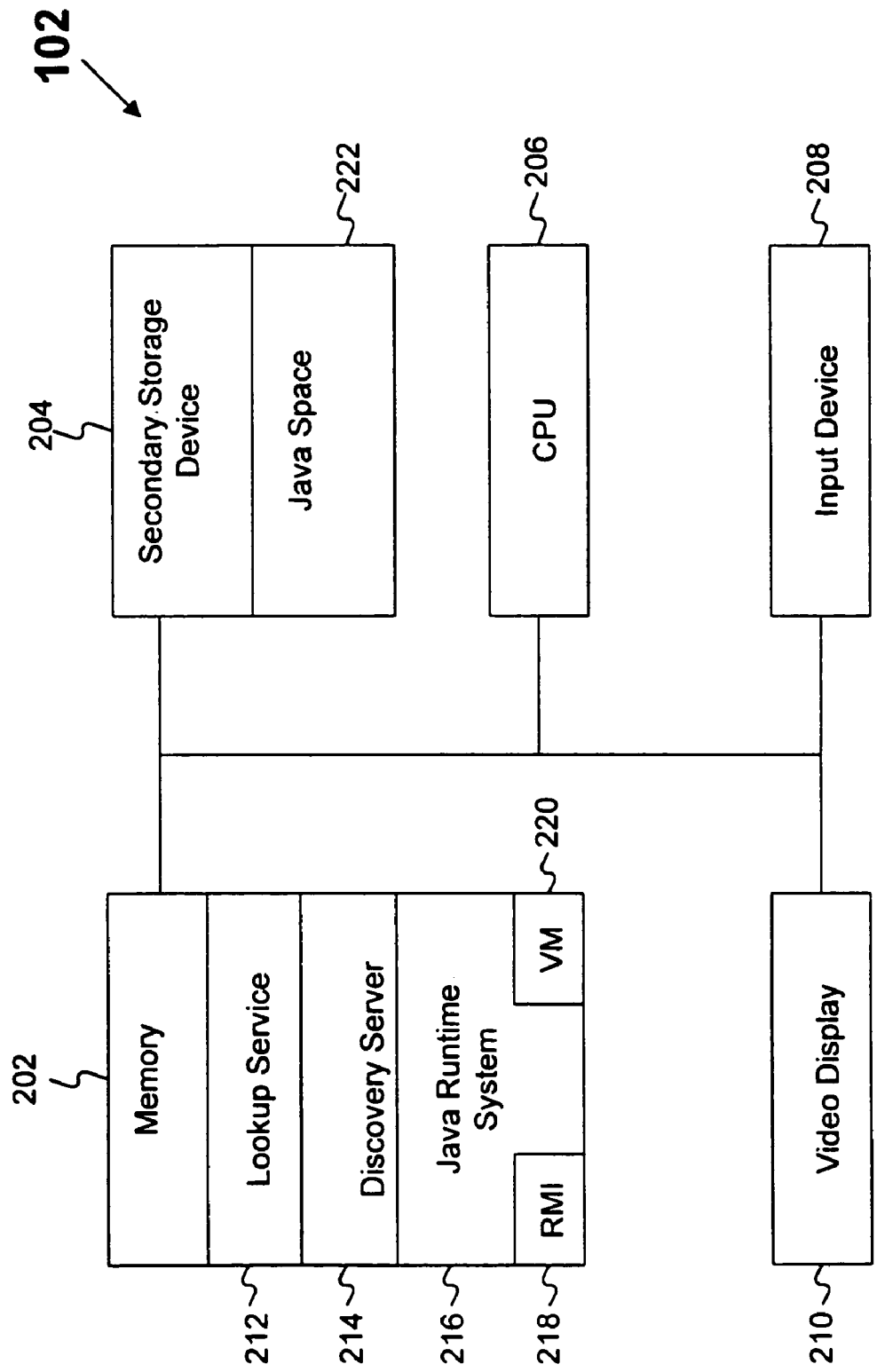
FIG. 2 depicts a more detailed block diagram of a computer depicted in FIG. 1.

FIG. 2 depicts the computer 102 in greater detail to show a number of the software components of the exemplary distributed system 100. One skilled in the art will appreciate that computer 104 or device 106 may be similarly configured. Computer 102 includes a memory 202, a secondary storage device 204, a central processing unit (CPU) 206, an input device 208, and a video display 210. The memory 202 includes a lookup service 212, a discovery server 214, and a Java runtime system 216. The Java runtime system 216 includes the Java remote method invocation system (RMI) 218 and a Java virtual machine 220. The secondary storage device 204 includes a Java space 222.

As mentioned above, the exemplary distributed system 100 is based on the Java programming environment and thus makes use of the Java runtime system 216. The Java runtime system 216 includes the Java Application Programming Interface (API), allowing programs running on top of the Java runtime system to access, in a platform-independent manner, various system functions, including windowing capabilities and networking capabilities of the host operating system. Since the Java API provides a single common API across all operating systems to which the Java runtime system 216 is ported, the programs running on top of a Java runtime system run in a platform-independent manner, regardless of the operating system or hardware configuration of the host platform. The Java runtime system 216 is provided as part of the Java software development kit available from Sun Microsystems of Mountain View, Calif.

The Java virtual machine 220 also facilitates platform independence. The Java virtual machine 220 acts like an abstract computing machine, receiving instructions from programs in the form of bytecodes and interpreting these bytecodes by dynamically converting them into a form for execution, such as object code, and executing them. RMI 218 facilitates remote method invocation by allowing objects executing on one computer or device to invoke methods of an object on another computer or device. Both RMI and the Java virtual machine are also provided as part of the Java software development kit.

The lookup service 212 defines the services that are available for a particular Djinn. That is, there may be more than one Djinn and, consequently, more than one lookup service within the exemplary distributed system 100. The lookup service 212 contains one object for each service within the Djinn, and each object contains various methods that facilitate access to the corresponding service. The lookup service 212 and its access are described in greater detail in co-pending U.S. patent application Ser. No. 09/044,826, entitled "Method and System for Facilitating Access to a Lookup Service," which has previously been incorporated by reference.

The discovery server 214 detects when a new device is added to the exemplary distributed system 100, during a process known as boot and join or discovery, and when such a new device is detected, the discovery server passes a reference to the lookup service 212 to the new device, so that the new device may register its services with the lookup service and become a member of the Djinn. After the device discovers the lookup service 212, the device may access any of the services registered with the lookup service 212. Furthermore, the device may also advertise its own services by registering with the lookup service 212. Once registered, the services provided by the device may be accessed through the lookup service 212, by all other entities that also discover lookup service 212. The process of boot and join is described in greater detail in U.S. patent application Ser. No. 09/044,939, now U.S. Pat. No. 6,560,656, entitled "Apparatus and Method for Providing Downloadable Code for Use in Communicating with a Device in a Distributed System," which has previously been incorporated by reference.

The Java space 222 is an object repository used by programs within the exemplary distributed system 100 to store objects. Programs use the Java space 222 to store objects persistently as well as to make them accessible to other devices within the exemplary distributed system. Java spaces are described in greater detail in co-pending U.S. patent application Ser. No. 08/971,529, entitled "Database System Employing Polymorphic Entry and Entry Matching," assigned to a common assignee, filed on Nov. 17, 1997, which is incorporated herein by reference. One skilled in the art will appreciate that the exemplary distributed system 100 may contain many lookup services, discovery servers, and Java spaces.

Although systems and methods consistent with the present invention are described as operating in the exemplary distributed system and the Java programming environment, one skilled in the art will appreciate that the present invention can be practiced in other systems and other programming environments. Additionally, although aspects of the present invention are described as being stored in memory, one skilled in the art will appreciate that these aspects can also be stored on or read from other types of computer-readable media, such as secondary storage devices, like hard disks, floppy disks, or CD-ROM; a carrier wave from the Internet; or other forms of RAM or ROM. Sun, Sun Microsystems, the Sun Logo, Java, and Java-based trademarks are trademarks or registered trademarks of Sun Microsystems, Inc. in the United States and other countries The Lookup Service Definition A lookup service provides a central registry of services available within a Djinn. This lookup service is the primary mechanism for programs to find services within the Djinn and is the foundation for providing user interfaces through which users and administrators can discover and interact with services of the Djinn.

The lookup service maintains a flat collection of service items. The collection is flat in that the service items do not form a hierarchy. Each service item represents an instance of a service available within the Djinn. The service item contains a stub (if the service is implemented as a remote object) or a serialized object (if the service is a local object stored in the lookup service) that programs use to access the service, and an extensible collection of attributes that describe the service or provide secondary interfaces to the service. A "stub" is code and data that facilitates access to a remote function, and a "serialized object" is an object placed in a serialized form.

Although the collection of service items is flat, a wide variety of hierarchical views can be imposed on the collection by aggregating items according to service types and attributes. The lookup service provides a set of methods to enable users and administrators to browse the collection and build a variety of user interfaces. Once an appropriate service is found, the user can interact with the service by loading a user interface applet, attached as another attribute on the item.

When a new service is created (e.g., when a new device is added to a Djinn), the service registers itself with the lookup service, providing an initial collection of attributes. For example, a printer may include attributes indicating speed (in pages per minute), resolution (in dots per inch), and whether duplex printing is supported. The attributes also contain an indicator that the service is new and needs to be configured. To configure a new service, the administrator locates an attribute that provides an applet for this purpose, and during configuration, the administrator may add new attributes, such as the physical location of the service and a common name for it. The lookup service provides an event mechanism that generates notifications as new services are registered, existing services are deleted, or attributes of a service are modified. To use the event mechanism, a client registers to be notified upon the occurrence of a particular event, and when the event occurs, the lookup service notifies the client.

Programs (including other services) that need a particular type of service can use the lookup service to find an instance of the service. A match may be made based on the specific Java programming language types implemented by the service as well as the specific attributes attached to the service.

If a service encounters a problem that needs administrative attention, like a printer running out of toner, the service can add an attribute that indicates the problem. Administrators (or programs) can then use the event mechanism to receive notification of such problems.

The attributes of a service item are represented as a set of attribute sets. An individual set of attributes may be represented as an instance of a class in the Java programming language, each attribute being a public field of that class. The class provides strong typing of both the set and the individual attributes. A service item can contain multiple instances of the same class with different attribute values as well as multiple instances of different classes. For example, an item may have multiple instances of a Name class, each giving the common name of the service in a different language, plus an instance of a Location class, an Owner class, and various service-specific classes.

Service Items are stored in the lookup service as instances of the ServiceItem class, as described below:

```
public class Service Item {
        public static final long ASSIGN_SERVICE_ID = 0;
        public long serviceID;
        public Object service;
        public Entry [ ] attributeSets;
}
```

The "serviceID" element is a numerical identifier of the service. The "service" element is an object representing the service or a stub facilitating access to the service, and the "attributeSets" element contains the array of attributes for the service.

Items in the lookup service are matched using instances of the ServiceTemplate class, and the ServiceItemFilter interface which are defined below:

```
public class Service Template {
        public static final long ANY_SERVICE_ID = 0;
        public long serviceID;
        public Class[ ] serviceTypes;
        public Entry[ ] attributeSetTemplates;
}
```

The "serviceTypes" element defines the types of the service. An item (item) matches a service template (tmpl) if item.serviceID equals tmpl.serviceID (or if tmpl.serviceID is zero) and item.service is an instance of every type in tmpl.serviceTypes, and item.attributeSets contains at least one matching entry for each entry template in tmpl.attributeSetTemplates. Entry matching uses the following rule: an entry matches an entry template if the class of the entry is the same as, or a superclass of, the class of the template and every non-null field in the template equals the corresponding field of the entry. Every entry can be used to match more than one template. Both serviceTypes and attributeSetTemplates can be null in a service template.

The ServiceItemFilter interface defines the methods used by an object to apply additional matching criteria when searching for services on a lookup service. This filtering mechanism is particularly useful to entities that wish to extend the capabilities of the standard template matching schema previously discussed. For example, since template matching does not allow one to easily search for services based on a range of attribute values, this additional matching mechanism can be exploited by the entity to ask the managing object to find all registered printer services that have a resolution attribute between 300 and 1200 dpi. As seen below, the "check" method defines the implementation of the additional matching criteria to apply to a ServiceItem object found through standard template matching. This method takes the ServiceItem object as the sole argument, to test against the additional criteria. This method returns true if the input object satisfies the additional criteria, and false otherwise.

```
public interface ServiceItemFilter
{
        public boolean check(ServiceItem item);
}
```

The ServiceMatches class is used for the return value when looking up multiple items. The definition of this class follows:

```
public class ServiceMatches {
        public ServiceItem[ ] items;
        public int totalMatches;
}
```

The interface to the lookup service is defined by a ServiceRegistrar interface data structure. This interface is not a remote interface. Instead, each implementation of the lookup service exports proxy objects that implement the ServiceRegistrar interface local to the client, using an implementation-specific protocol to communicate with the actual remote server. "Proxy objects" refer to objects that run in the client's address space and that facilitate access to the lookup service. Methods are provided to register service items, find items that match a template, modify attributes of existing items, receive notifications when items are modified, and incrementally explore the collection of items along the three major axes: service ID, service type, and attributes. The definition of the interface follows:

```
public interface ServiceRegistrar {
        long REGISTRAR_SERVICE_ID = 1;
        ServiceLease register (Service Item item,
long lease expiration) throws RemoteException;
        Object lookup (ServiceTemplate tmpl)
                throws RemoteException
        ServiceMatches lookup(ServiceTemplate tmpl,
        int maxMatches)
                throws RemoteException;
        int addAttributes (ServiceTemplate tmpl,
        Entry [ ] attrSets)
                throws RemoteException;
        int modifyAttributes(ServiceTemplate tmpl,
        Entry [ ] attrSets)
                throws RemoteException;
        int TRANSITION_MATCH_NOMATCH = 1;
        int TRANSITION_NOMATCH_MATCH = 2;
        int TRANSITION_MATCH_MATCH = 3;
        EventRegID notify (Service Template tmpl,
                int transition,
                RemoteEventListener listener,
                MarshalledObject handback,
                long leaseExpiration)
```

```
                throws RemoteException;
        Class [ ] getEntryClasses (ServiceTemplate tmpl)
                throws RemoteException;
        Object [ ] getFieldValues (ServiceTemplate tmpl),
                        int setIndex,
                        String field)
                throws NoSuchFieldException,
                        RemoteException;
        Class [ ] getServiceTypes (Service Template tmpl,
                        String packagePrefix
                throws RemoteException
```

This interface includes various methods, including the register method, the lookup method (single parameter form), the lookup method (two parameter form), the addAttributes method, the modifyAttributes method, the notify method, the getEntryClass method, the getFieldValues method, and the getServiceTypes method. The "register" method is used to register a new service and to re-register an existing service. This method is defined so that it can be used in an idempotent fashion. Specifically, if a call results in generation of an exception (in which case the item might or might not have been registered), the caller can simply repeat the call with the same parameters.

To register a new service using the register method, item.ServiceID should be zero; if item.ServiceID does not equal any existing item's service object, then a new unique service id will be assigned and returned. The service id is unique over time with respect to this lookup service. If item.ServiceID does equal an existing item's service object, the existing item is deleted from the lookup service (even if it has different attributes), but that item's service id is reused for the newly registered item.

To re-register an existing service using the register method, item.ServiceID should be set to the same unique service id that was returned by the initial registration. If an item is already registered under the same service id, the existing item is deleted (even if it has different attributes or a different service instance). Note that service object equality is not checked in this case to allow for reasonable evolution of the service (e.g., the serialized form of the stub changes, or the service implements a new interface).

When an item is registered, duplicate attribute sets are eliminated in the stored representation of the item. Additionally, the registration is persistent across restarts of the lookup service.

The single-parameter form of the "lookup" method returns the service object (i.e., ServiceItem.service) from an item matching the template, or null if there is no match. If multiple items match the template, it is arbitrary as to which service object is returned. If the returned object cannot be deserialized, an exception is generated.

The two-parameter form of the "lookup" method returns at most maxMatches items matching the template, plus the total number of items that match the template. The return value is never null, and the returned items array is only null if maxMatches is zero. For each returned item, if the service object cannot be deserialized, the service field of the item is set to null and no exception is generated. Similarly, if an attribute set cannot be deserialized, that element of the attributeSets array is set to null and no exception is generated.

The "addAttributes" method adds the specified attribute sets (those that aren't duplicates of existing attribute sets) to all items matching the template. The number of items that were matched is returned. Note that this operation has no effect on existing attribute sets of the matching items. and the operation can be repeated in an idempotent manner.

The "modifyAttributes" method is used to modify existing attribute sets. The lengths of tmpl.attributeSetTemplates and attrSets must be equal or an exception is generated. For each item that matches the template, the item's attribute sets are modified as follows. For each array index I: if attrSets[i] is null, then every entry that matches tmpl.attributeSetTemplates[i] is deleted; otherwise, for every non-null field in attrSets [I], the value of that field is stored into the corresponding field of every entry that matches tmpl.attributeSettemplates[i]. The class of attrSets[i] must be the same as, or a superclass of, the class of tmpl.attributeSetTemplates [I], or an exception is generated. If the modification results in duplicate entries within an item, the duplicates are eliminated. The number of items that were matched is returned.

The "notify" method is used to register for event notification. The registration is leased, and the lease expiration request is exact. The concept of a lease is described in greater detail in U.S. patent application Ser. No. 09/044,923, now U.S. Pat. No. 6,263,350 entitled "Method and System for Leasing Storage," which has previously been incorporated by reference. The registration is persistent across restarts of the lookup service until the lease expires or is canceled. The event id in the returned EventRegId is unique at least with respect to all other active event registrations at this lookup service with different service templates of transitions.

While the event registration is in effect, a notification containing an indication of the event is sent to the specified listener whenever a register, lease cancellation or expiration, addAttributes, or modifyAttributes operation results in a service item changing state in a way that satisfied the template and transition combination. A list of the transitions follows, although other transitions may also be implemented within the scope of the present invention:

TRANSITION_MATCH_NOMATCH: an event is sent when the changed item matches the template before the operation, but doesn't match the template after the operation (this includes deletion of the item).

TRANSITION_NOMATCH_MATCH: an event is sent when the changed item doesn't match the template before the operation, (this includes not existing), but does match the template after the operation.

TRANSITION_MATCH_MATCH: an event is sent when the changed item matches the template both before and after the operation.

The "getEntryClasses" method looks at all items that match the specified template, finds every entry among those items that either doesn't match any entry templates or is a subclass of at least one match entry template, and returns the set of the (most specific) classes of those entries. Duplicate classes are eliminated, and the order of classes within the returned array is arbitrary. Null (not a empty array) is returned if there are no such entries or no matching items. If a returned class cannot be deserialized, that element of the returned array is set to null and no exception is thrown.

The "getFieldValue" method identifies all items that match the specified template. This method returns the values of the items that match the specified template.

The "getServiceTypes" method looks at all items that match the specified template, and for every service object, this method finds every type (class or interface) of which the service object is an instance that is neither equal to, nor a superclass of, any of the service types in the template, and returns the set of all such types that start with the specified package prefix. Duplicate types are eliminated, and the order of types within the returned array is arbitrary. Null (not an empty array) is returned if there are no such types. If a returned type cannot be deserialized, that element of the returned array is set to null and no exception is thrown.

The Lookup Service Processing

Figure 3A:
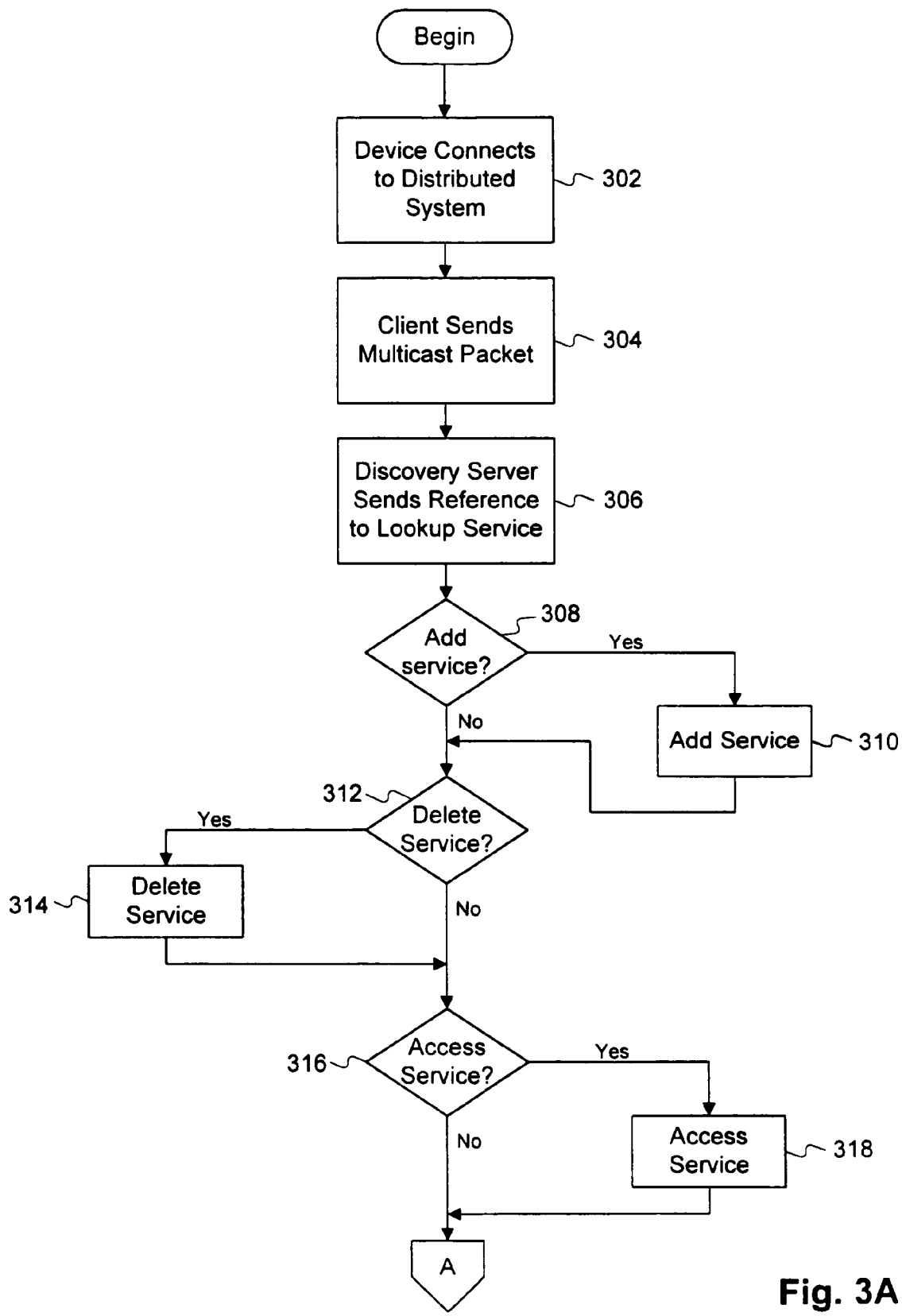
FIGS. 3A and 3B depict a flow chart of the steps performed when a client utilizes the lookup service depicted in FIG. 1.
Figure 3B:
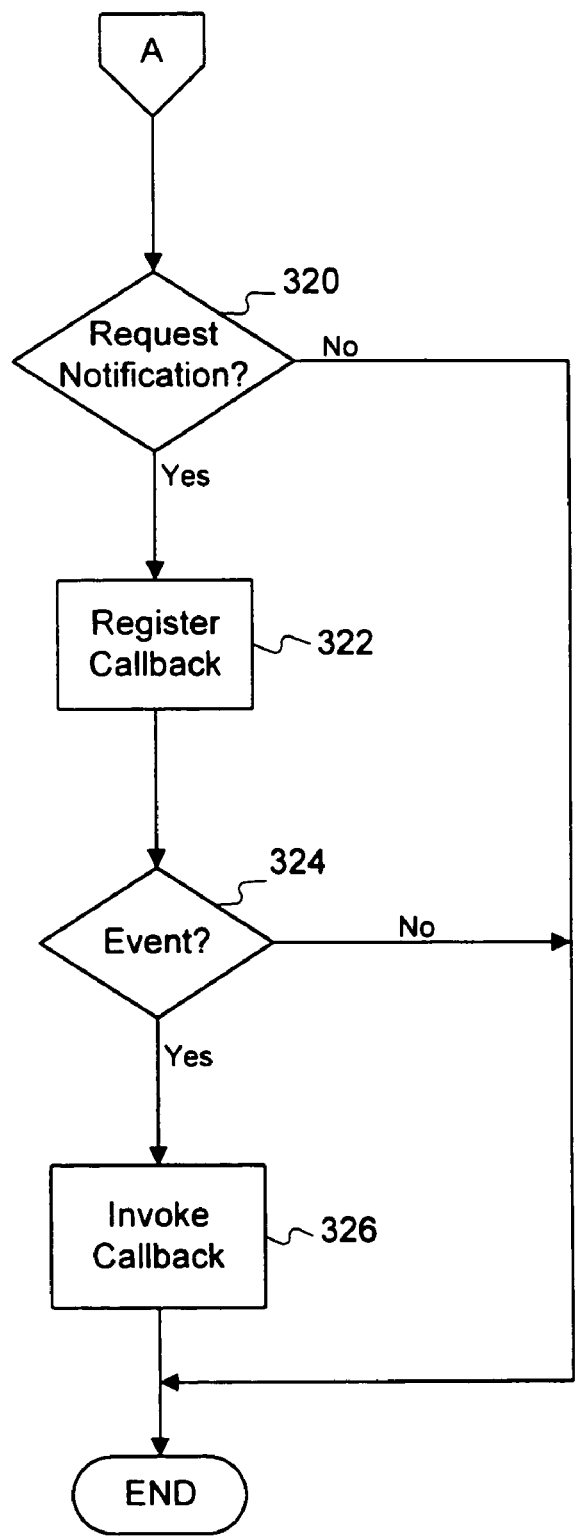

FIGS. 3A and 3B depict a flowchart of the steps performed when a client, a program running on a particular device, makes use of the lookup service 212. Initially, the device on which the client runs is connected to the Jini distributed system (302). Next, the client sends a multi-cast packet containing code for communication with the client (step 304). In this step, the client is performing the discovery protocol as described in further detail in U.S. patent application Ser. No. 09/044,945, now U.S. Pat. No. 6,578,044, entitled "Apparatus and Method for Providing Downloadable Code for Use in Communication With a Device in a Distributed System," which has previously been incorporated by reference.

After the client sends the multi-cast packet, the discovery server 214 receives the packet and uses the code contained in the packet to send a reference to the lookup service to the client (step 306). After the client receives the reference to the lookup service, the client is able to utilize the interface of the lookup service to either add a service, delete a service, access a service, or request notification when the lookup service is updated, as reflected by steps 308-326.

At some point during the processing of the client, it may decide to add a service to the lookup service (step 308). If it decides to add a service, the client adds a service to the lookup service by invoking the register method, which sends to the lookup service either an object representing the service or a stub containing code and data to facilitate access to the service (step 310). The addition of the stub to the lookup service is described in greater detail in co-pending U.S. patent application Ser. No. 09/044,826, entitled "Method and System for Facilitating Access to a Lookup Service," which has previously been incorporated by reference.

Next, the client may decide to delete one of its services from the lookup service (step 312). If a client decides to do so, the client deletes the service from the lookup service by canceling the service's lease with the lookup service (step 314). It should be noted that both the addition of service and the deletion of a service are done dynamically and in a manner that does not prohibit other clients from using the lookup service while the update occurs.

At some point later in the processing of the client, the client may decide to access a service provided by the lookup service (step 316). If a client decides to access a service provided by the lookup service, the client accesses the service by invoking the lookup method, which retrieves from the lookup service either the object or the stub information for the service, and the client then either invokes methods on the object to use the service or uses the stub information to access the service (step 318). The step is described in greater detail in co-pending U.S. patent application Ser. No. 09/044,826, entitled "Method and System for Facilitating Access to a Lookup Service," which has previously been incorporated by reference.

The client may also request to be notified when an update occurs to the lookup service (step 320 in FIG. 3B). If a client wishes to be notified, the client invokes the notify method on the lookup service interface to register a callback routine with the lookup service (step 322). A "callback routine" is a function that is invoked when the lookup service is updated. Additionally, the notify method allows the client to register an object that will be passed back, via RMI, as a parameter to the callback function.

Next, if an event has occurred for which the client wants to be notified (step 324), the registered callback routine is invoked by the lookup service (step 326). In this step, the client is notified of the occurrence of the event and can take appropriate action. For example, if a service that the client was currently using has become unavailable, the client may store information so that it no longer uses it.

Figure 4:
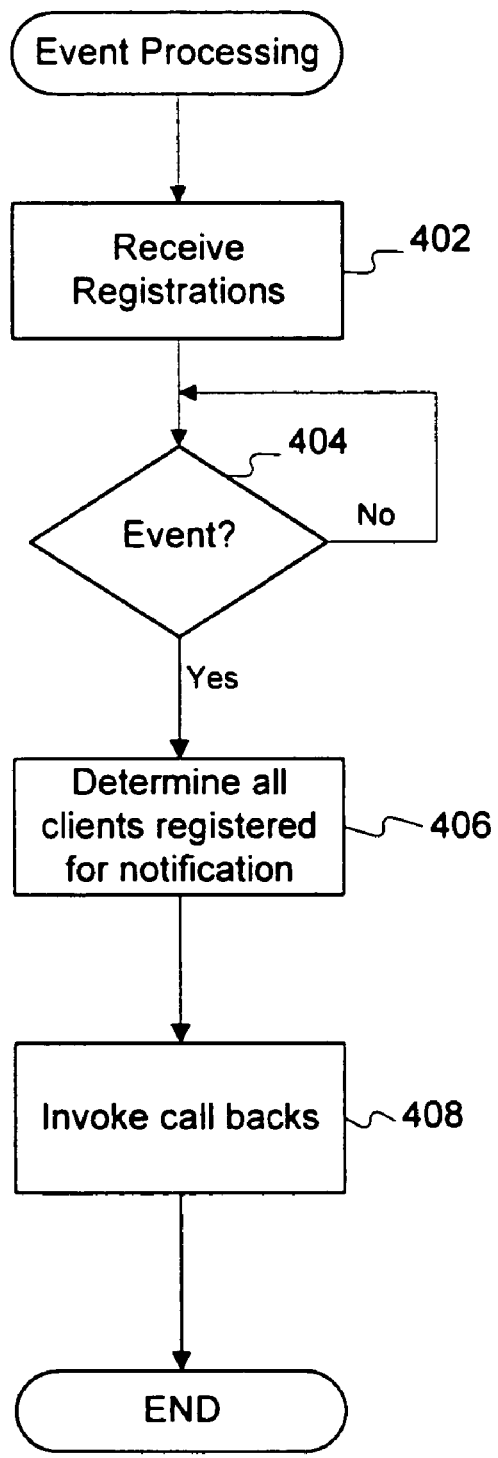
FIG. 4 depicts a flow chart of the steps performed by the lookup service of FIG. 1 when performing event-related processing.

FIG. 4 depicts a flow chart of the steps performed by the lookup service when performing event-related processing. Initially, the lookup service receives registrations from a number of clients interested in receiving notifications when particular events occur (step 402). In this step, the lookup service receives the registrations via invocation of the notification method on the lookup service interface and stores into a table, known as the event table, all of the associated information, such as an indication of the client to be notified, a reference to the callback routine, an object to be passed as a parameter to the callback routine, and an indication of the event in which the client is interested. It should be noted that a client may register to be notified upon the occurrence of an event, or the client may register for a third party to be notified. After receiving the registrations, the lookup service determines whether an event occurred such that at least one client has registered an interest in the event (step 404). The lookup service makes this determination by identifying when, for example, a new service has been added to the lookup service, an existing service has been deleted from the lookup service, or the attributes of a service have been modified. If such an event has not occurred, the event notification process of the lookup service remains in a wait state.

However, if an event has occurred, the lookup service determines all clients registered for notification for this event (step 406). The lookup service makes this determination by accessing the event table. Next, the lookup service invokes the callback routines registered for each client identified in step 406 (step 408). In this step, the event table contains a reference to the callback routine registered by each client, and the lookup service invokes each callback routine, passing the registered objects as parameters, to notify the clients of the occurrence of the event.

ALTERNATIVE EMBODIMENT

Figure 8:
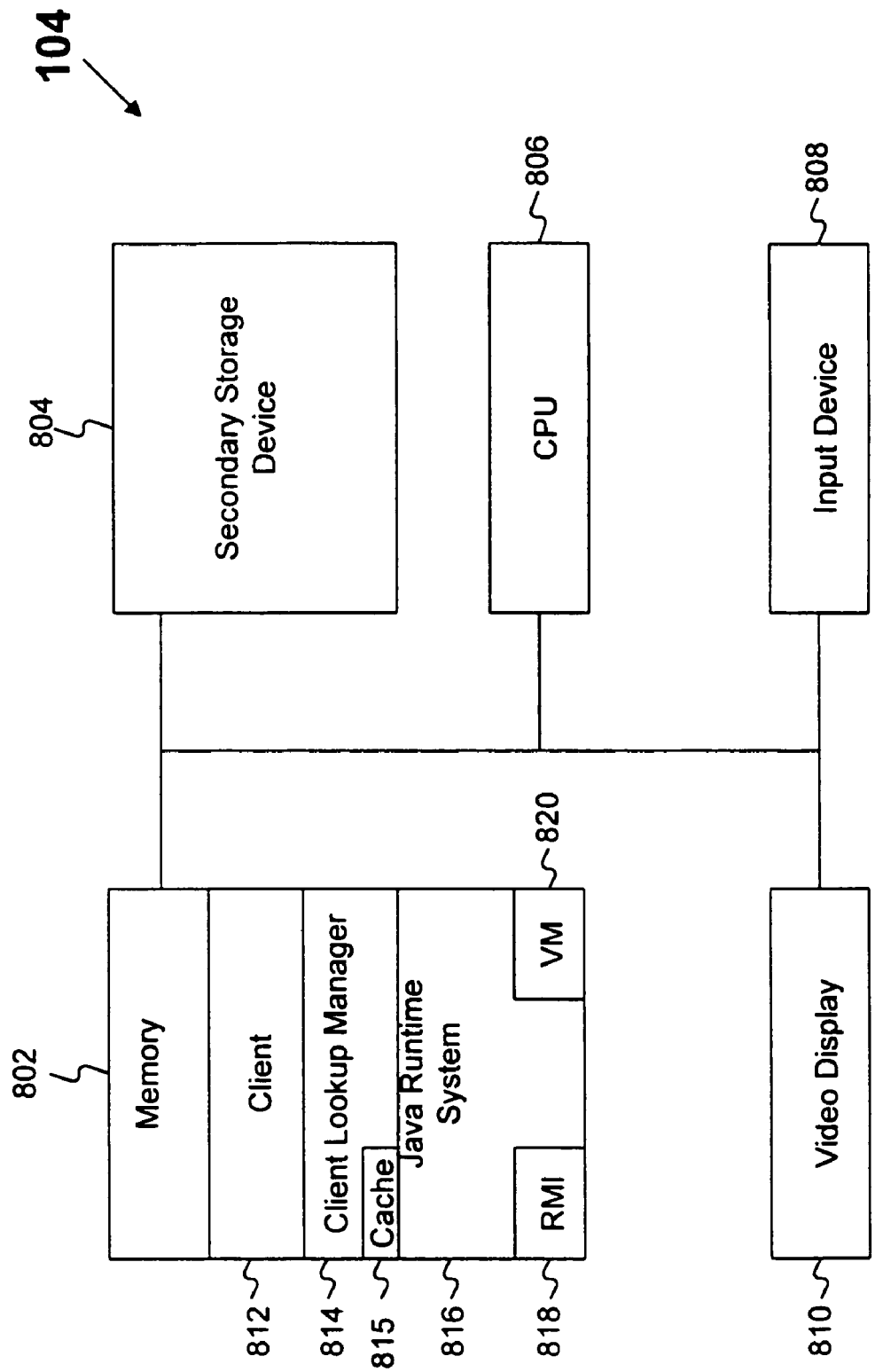
FIG. 8 depicts an alternate embodiment of the computer depicted in FIG. 2.

Since lookup services are generally located on a computer remote from the client, a query to a lookup service typically involves a remote call. Such remote calls are much more costly in terms of processing overhead and failure risk than are local procedure calls. This cost is magnified when a client must make frequent queries for multiple services. Such scenarios make it desirable for a client to internally store references to discovered lookup services and network services of interest. This approach permits the client to identify and access lookup services by simply searching a locally stored cache. It also provides the capability for a client to efficiently react to network failures by maintaining a redundant collection of network services. The processing overhead required to perform these functions also makes it desirable to delegate the scheduling of them to a client lookup manager, and thereby free the client to perform other functions. FIG. 8 depicts a client computer in accordance with an alternate embodiment of the present invention. As shown in FIG. 8, computer 104, includes a memory 802, secondary storage device 804, CPU 806, input device 808, video display 810, and Java runtime system 316. Client computer 104 additionally includes a client 812, a client lookup manager 814 and a cache 815. The client lookup manager 814 is implemented by a client lookup manager class comprised of a helper utility class that any client 812 can use to create and populate a cache 815, and with which the client can register for notification of the availability of services of interest. A helper utility is a programming component that can be used during construction of Jini services and/or clients. Helper utilities are not remote. In other words, their methods typically do not execute on remote hosts. Consequently, they do not register with a lookup service and they are instantiated locally by devices wishing to employ them.

Figure 9:
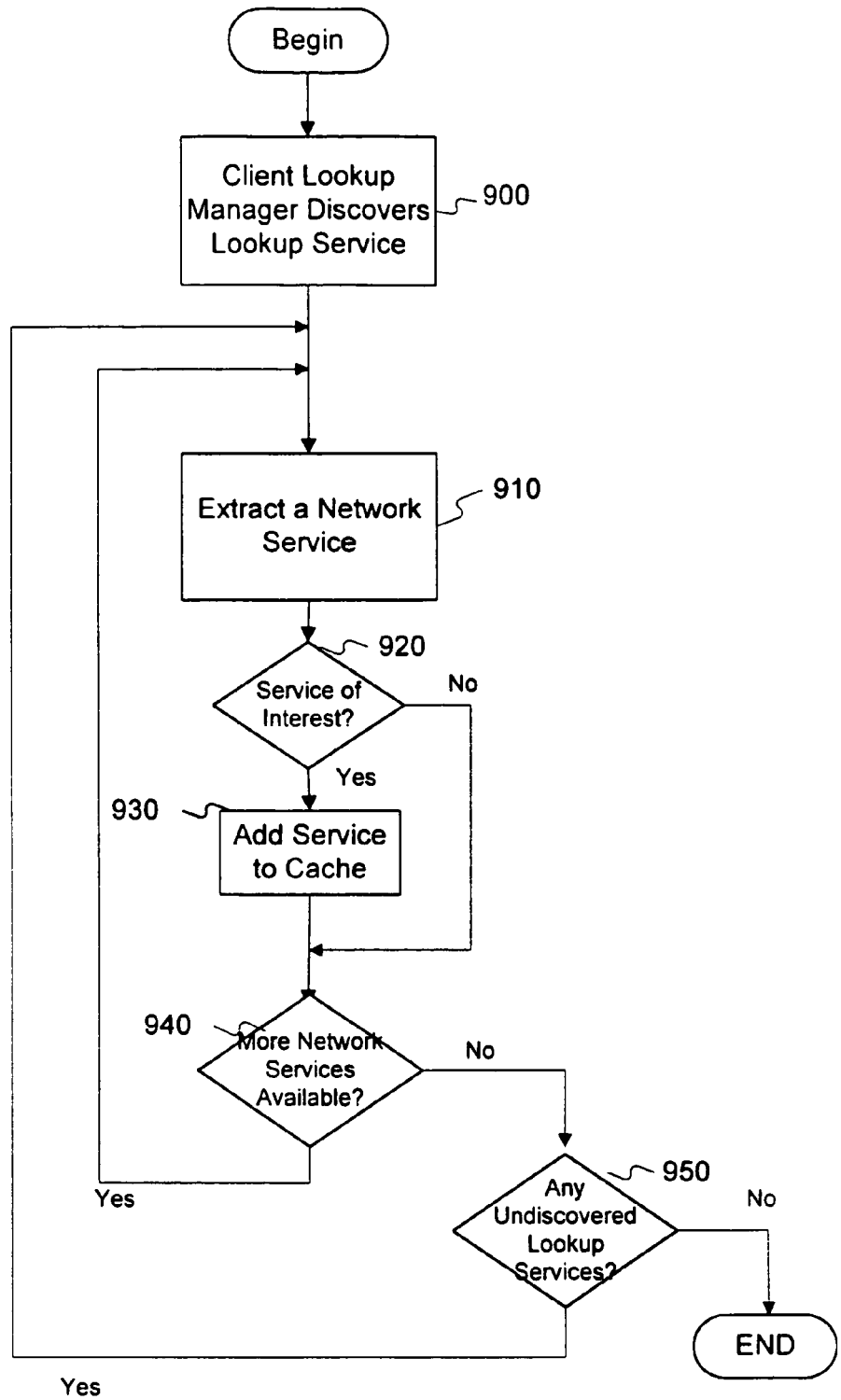
FIG. 9 depicts a flow chart of the steps performed by the client lookup manager of FIG. 8 when populating the cache.

In accordance with the alternate embodiment, when the client lookup manager discovers a lookup service 212, the client lookup manager 814 evaluates each of the associated network services and stores references to network services of interest in the local cache 815. As shown in FIG. 9, when the client lookup manager receives a reference to a lookup service (step 900), it extracts the network service (step 910) and evaluates whether the service is of interest to the client (step 920). If the service is of interest, the client lookup manager adds the service to the cache in step 930 and process flows to step 940. If the service is not of interest, process immediately flows to step 940 where the client lookup manager determines whether there are more network services available in the lookup service. If there are more services available, program execution returns to step 910, where another network service is extracted. If there are not any more network services available, process flows to step 950 where the client lookup manager determines whether there are any remaining undiscovered lookup services. If there are undiscovered lookup services, program execution returns to step 900 and a new lookup service is discovered. In the event that all lookup services have been discovered, then the process of populating the cache is complete and program execution ends.

Figure 10:
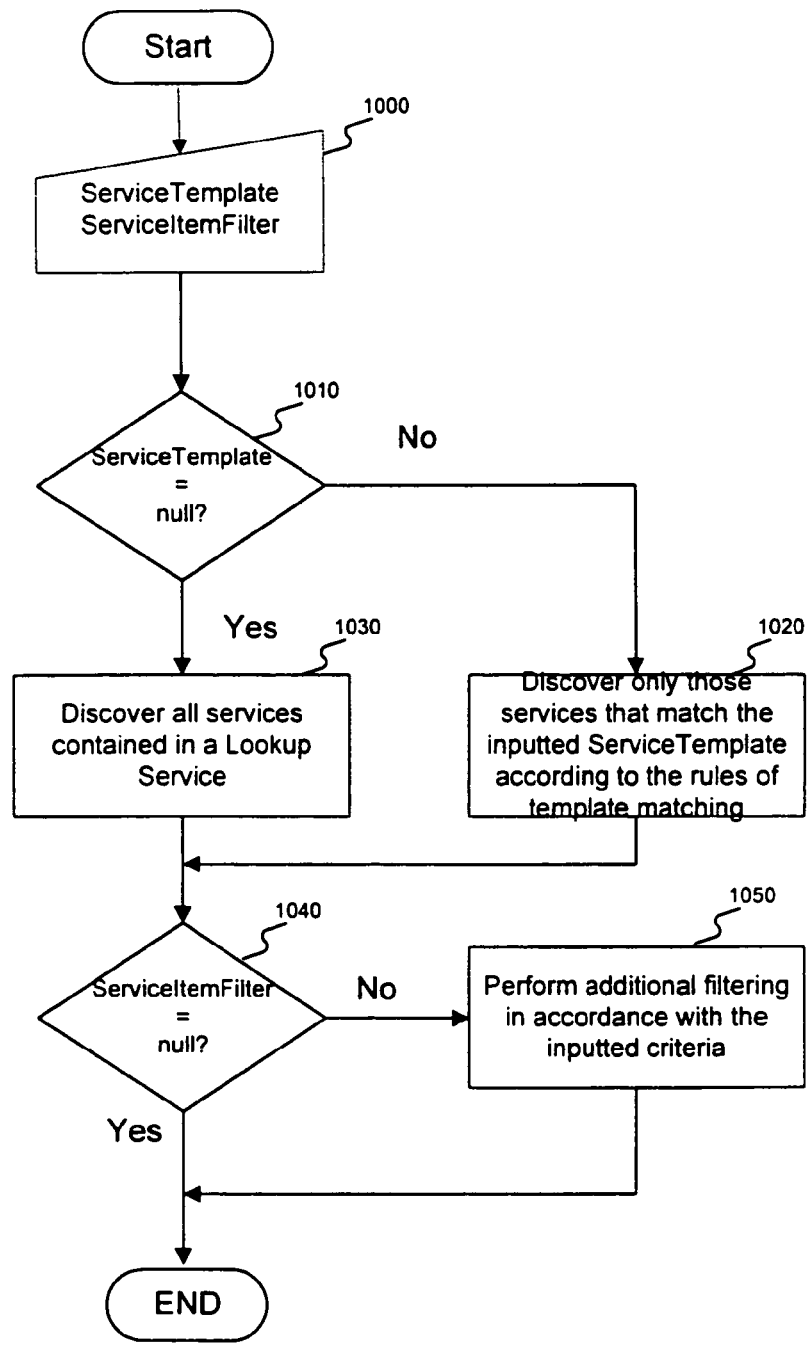
FIG. 10 depicts a flow chart of the steps performed by the filtering algorithm contained within the client lookup manager.

To perform the function of populating the cache as shown in step 920, the client lookup manager utilizes a complex filtering algorithm to extract any subset of network services desired by a client. As shown in FIG. 10, this process begins in step 1000 with a user inputting the ServiceTemplate and ServiceItemFilter arguments described earlier. As shown in step 1010, a null reference input to the template argument is treated as the equivalent of inputting a ServiceTemplate constructed with all null arguments (all wildcards). That is, as shown in step 1030, the cache attempts to discover all services contained in a lookup service. Otherwise, the cache attempts to discover services contained in each lookup service that match the inputted criteria (step 1020). Next, the process performs the filtering specified by the ServiceItemFilter argument. In contrast to a null input to the ServiceTemplate as previously discussed, a null input to the filter argument (step 1040) has the opposite effect in that processing terminates and only template-matching will be employed to find the desired services. Otherwise, additional filtering in accordance with the inputted criteria will be employed (step 1050) and the cache will be populated accordingly.

Figure 11:
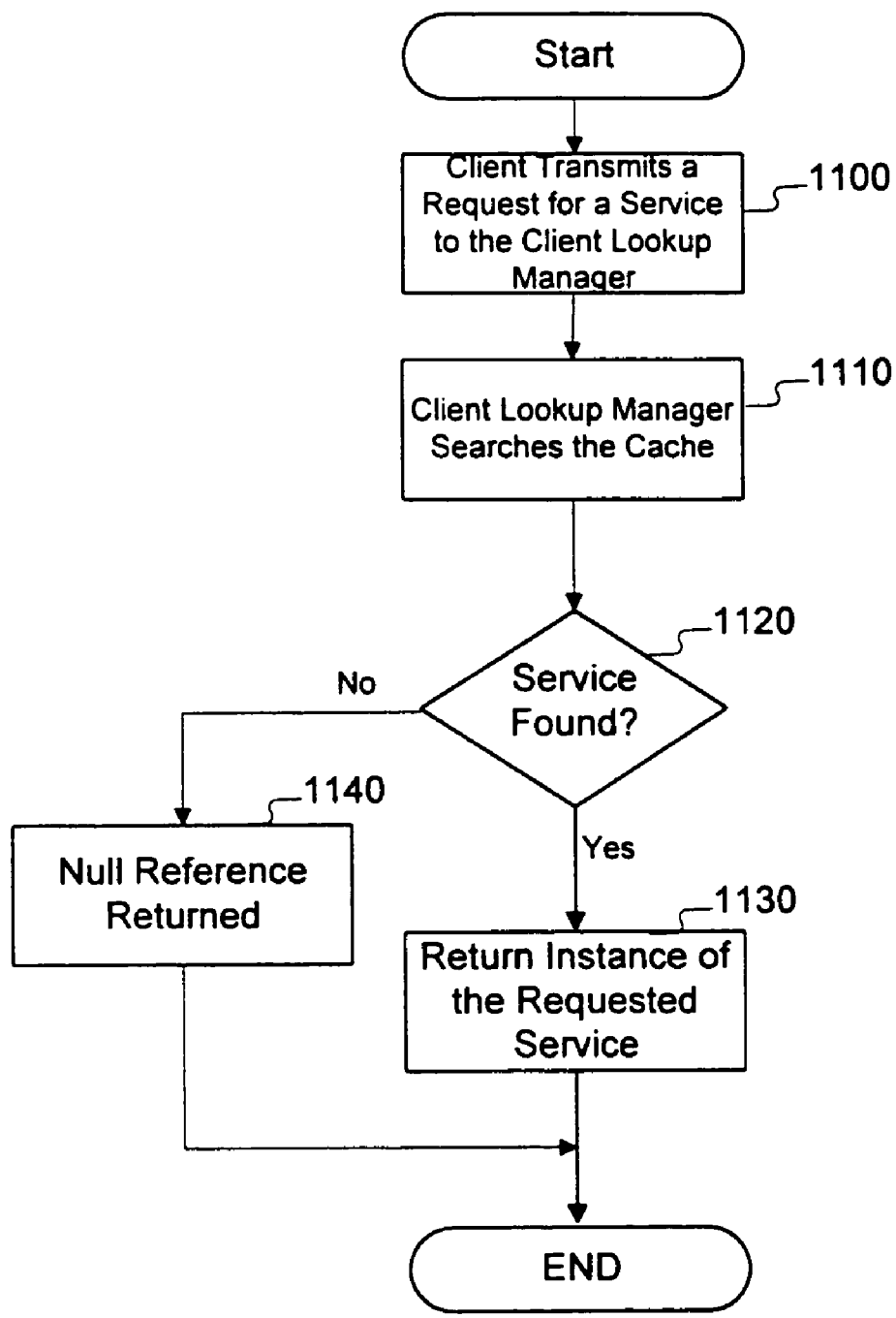
FIG. 11 depicts a flow chart of the steps performed by a first query processing algorithm contained within the client lookup manager.

Once the cache is populated, the client lookup manager handles all activities related to the cache including accessing, updating and deleting the cache. For example, as shown in FIG. 11, when the client desires access to a service reference, it transmits a request, via a local event to the client lookup manager (step 1100). In step 1110, the client lookup manager searches the cache to determine whether an instance of the requested service is stored in the cache. If the service is found (step 1120), the client lookup manager returns an instance of the requested service in step 1130 and the process ends. If, the service is not found, the client lookup manager returns a null reference in step 1140, and the process terminates. Depending on the specific implementation of the client lookup manager, the process can either re-institute a new search, wait for a new query request from the client, or re-query the associated lookup services.

Figure 12:
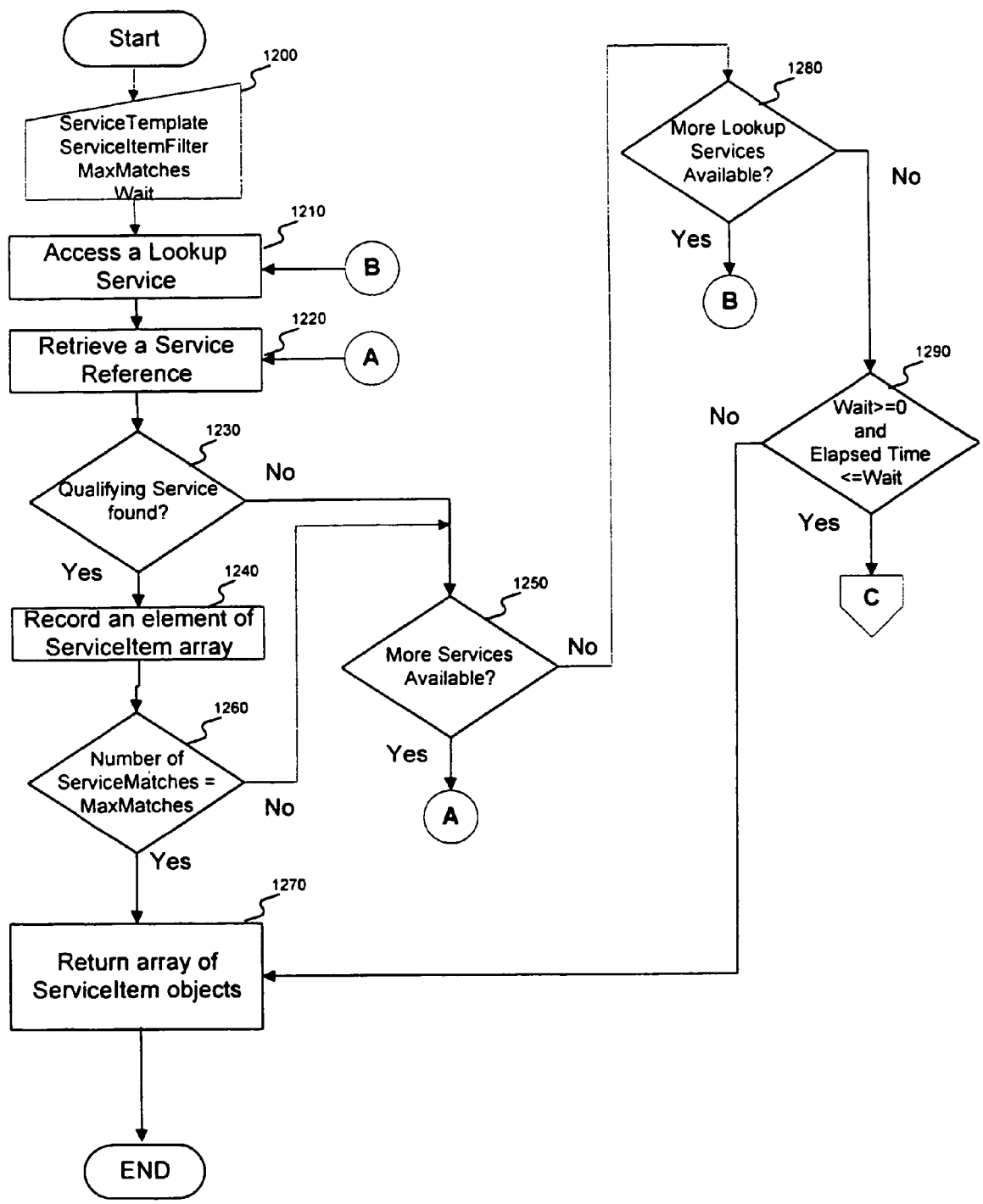
FIGS. 12A and 12B depict a flow chart of the steps performed by a second query processing algorithm contained within the client lookup manager.
Figure 12B:
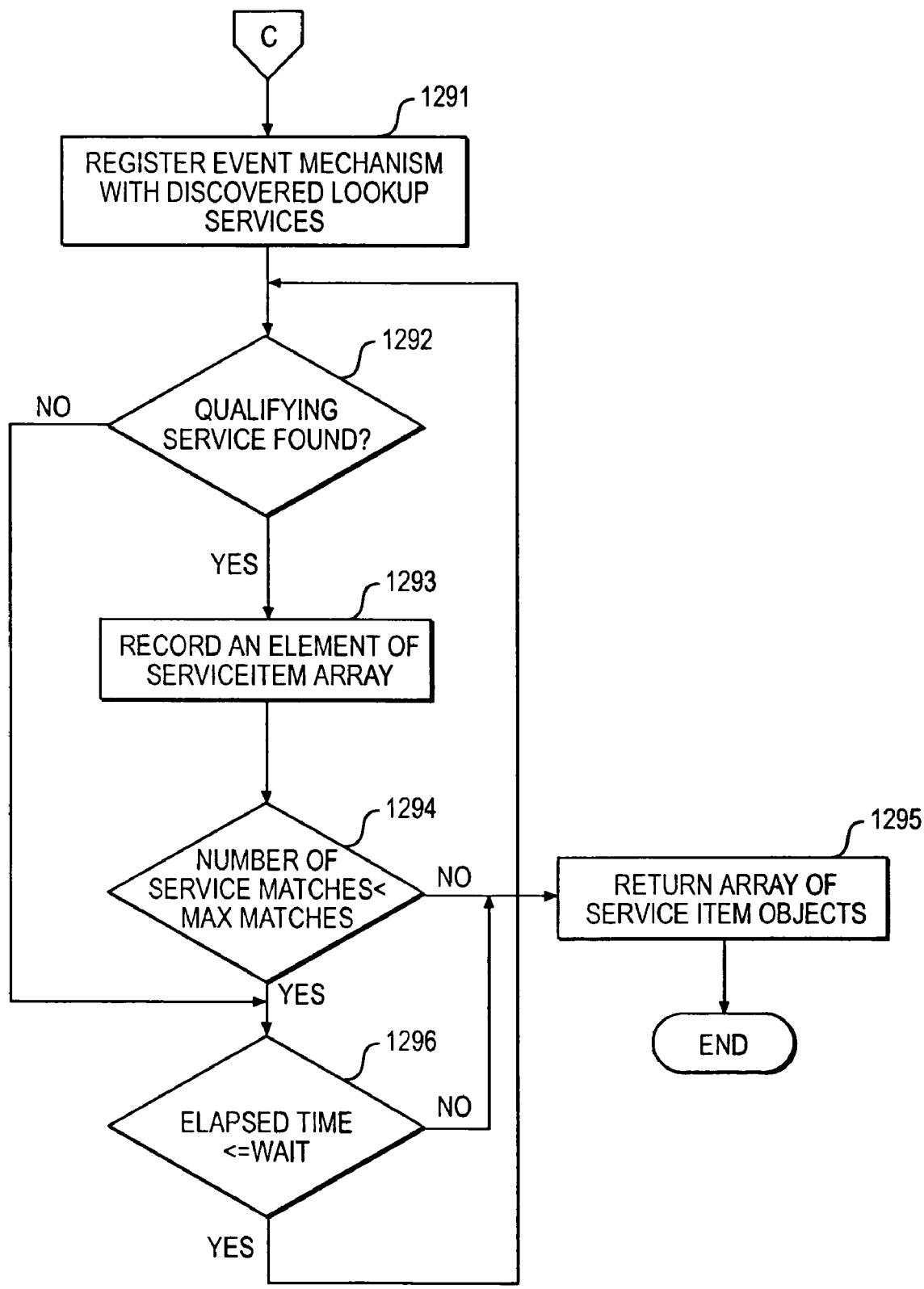

As shown in FIGS. 12A and 12B, if a requested service reference is not found in the cache or if an insufficient number of references is retrieved (in the case of a client request for multiple references), the client lookup manager can re-query the associated lookup services. As shown in step 1200, this form of lookup takes as input an integer argument (Max-Matches) that represents the maximum number of matches that should be returned. In other words, the object returned by this method will contain no more than that number of service references, although it may contain less. This method also takes an integer argument (WAIT) that indicates the maximum amount of time the process is to wait before returning the identified service references. This argument prevents the client lookup manager from attempting to discover a requested number of MaxMatches for an infinite period of time. This feature is particularly useful to a user who is interested in choosing a service from a list of possible candidates instead of receiving a single service.

Once the ServiceTemplate, ServiceItemFilter, Max-Matches, and WAIT arguments are input, the process proceeds to step 1210 where the method accesses a lookup service. In step 1220, the method retrieves a service reference from the lookup service and in step 1230, determines whether the retrieved service reference is a qualifying service. If a qualifying service is found, the process proceeds to step 1240 and an array of ServiceItem objects is recorded. Otherwise, the process proceeds to step 1250. After an array of ServiceItem objects is recorded in step 1240, the process then compares the number of identified matches with the MaxMatches value previously input (step 1260). If the number of identified matches equals the MaxMatches value, the process returns the identified array of ServiceItem objects in step 1270 and the process terminates. Otherwise, the process proceeds to step 1250. As indicated earlier, this process will wait a predetermined period of time for the client lookup manager to identify the requested number of qualifying services. But, it returns immediately upon discovering the requested number of service references. In step 1250, the process determines whether any more unexamined services exist inside the lookup service. If there are more, process flows to step 1220 and another service reference is retrieved. If there are no more services in the lookup service, process flows to step 1280 to determine whether any more unexamined lookup services exist. If there are more lookup services, the process continues back to step 1210 to access another lookup service. If there are no more unexamined lookup services in step 1280, the process proceeds to step 1290 where the method determines whether the WAIT argument has been invoked (WAIT>=0) and if so, whether the duration has been exceeded.

The "wait" feature is quite useful to entities that cannot proceed until such a service of interest is found. As shown in FIGS. 12A and 12B, entities wishing to employ this feature must input a positive value to the WAIT argument which represents the number of milliseconds to wait for the desired service or services to be discovered. If a non-positive value is input to this argument, then this method will not wait. It will simply query all available lookup services once, and return the array of identified ServiceItem objects. If WAIT has been invoked and the elapsed time exceeds the WAIT duration, the process continues to step 1270, returns the array of ServiceItem objects found thus far and then the process terminates. On the other hand, if WAIT has been invoked and the duration has not been exceeded, the process continues to step 1291 and the client lookup manager registers with the event mechanism of the discovered lookup services. The event mechanism requests the lookup services notify the client lookup manager when one of the lookup service's associated networks services changes. When a service changes, the client lookup manager determines whether the new service is a service of interest in step 1292. If the service is of interest, it is recorded in the ServiceItem array (step 1293). Otherwise, execution flows to step 1296 where the process determines whether the elapsed time is less than or equal to the WAIT duration. If it is, the client lookup manager waits to be notified of a new service. If the time has expired, the client lookup manager returns the array of ServiceItem objects found thus far in step 1295. Once a service is recorded in the ServiceItem array (step 1293) the client lookup manager determines whether the number of ServiceMatches is less than MaxMatches. If it is, execution flows to step 1296 where the process determines whether the elapsed time is less than or equal to the WAIT duration. If the number of ServicesMatches is equal to MaxMatches, then the desired number of services has been found and process flows to step 1295 where the identified array is returned. It should be obvious to those skilled in the art that instead of an array of objects, this process could return an instance of an object without departing from the scope of this process. It should also be obvious to those skilled in the art that instead of returning when the total number of references equals the maxMatches object, this method could instead return once a minimum number of references (minMatches) have been found.

Figure 13:
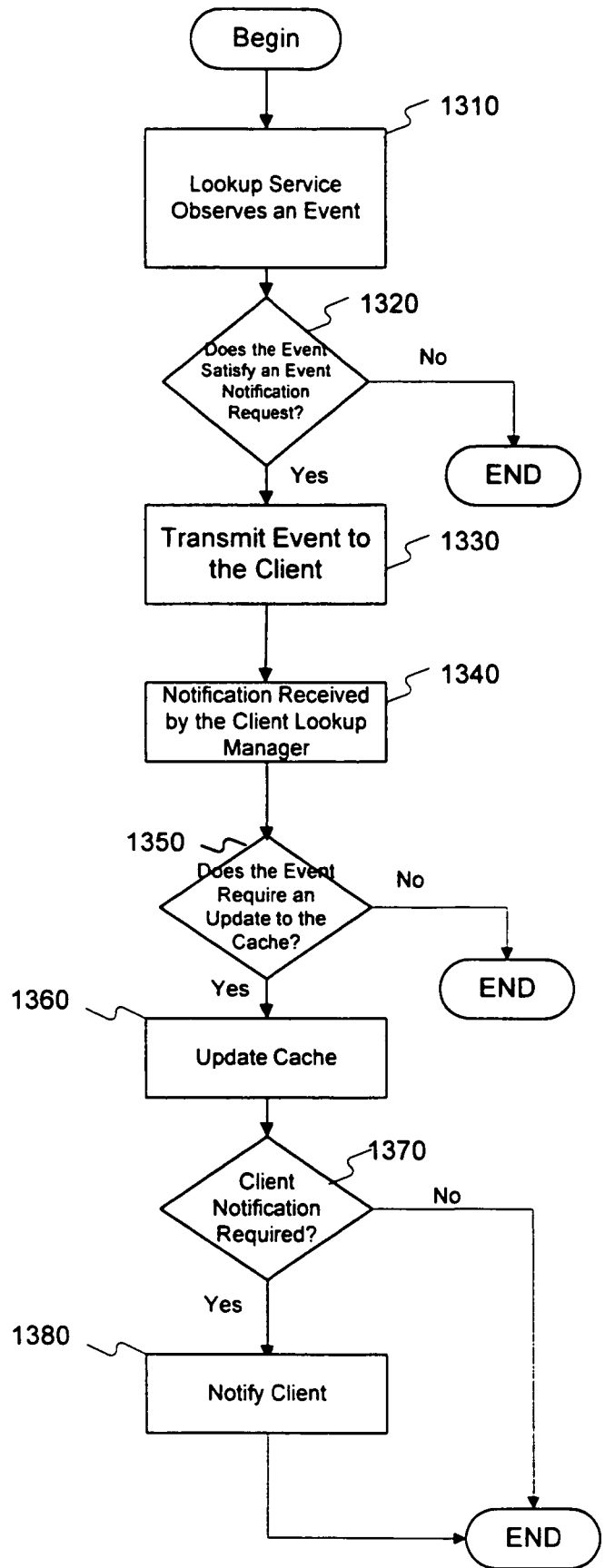
FIG. 13 depicts a flow chart of the steps performed by a notification process contained within the client lookup manager.

Just as the client may request that it be notified of state changes in network services occurring within each lookup service, as previously described in FIG. 4, so too can the cache request that it be notified. In other words, the client and the cache can separately be notified of the same or different events after receiving notification from a lookup service. FIG. 13 shows the steps performed by the client lookup manager when either the cache or the client has requested event notification. First, as shown in step 1310, the lookup service observes a state change in a registered service. Next, the lookup service determines, in step 1320, whether the event satisfies matching criteria specified by one of its associated clients. If it does, the lookup service transmits the event notification to the requesting client (step 1330) via a remote event. If the event does not satisfy matching criteria, the process ends. Next, the cache (step 1350) determines whether the reported event necessitates a cache update. More specifically, since the cache may receive multiple events corresponding to the same service, it must first determine whether it has previously been notified of this particular event. For example, a particular service may be registered with more than one lookup service or multiple configurations of the same service can be registered with a lookup service. When a lookup service reports an event to a client, the lookup service has no way of knowing whether the event has previously been reported to the client via another lookup service. If the cache has not previously been notified of this event, the cache is updated in step 1360. Otherwise, the process ends (note: if the cache has been previously notified, then the client has also previously been notified). Once the cache has been updated, it next determines whether the client is required to be notified as well (step 1370). If the client requested notification, a notification message is sent via local event to the client in step 1380 and the process terminates. This "many-to-one" relationship between the events received by the cache 815 and the events sent by the cache hides from the client 812, the lookup services with which the cache 815 interacts. For many entities that use the cache's event mechanism to interact with the cache's discovered services, knowledge of the number of distinct service references, as well as identification of the lookup services with which those references are registered, is of no interest. Such entities typically are interested only in acquiring a reference—not all references to the services it needs to do its job. For entities which are interested in this additional information, the cache 815 provides methods separate from the event mechanism for obtaining that information.

The Conference Room Example

Figure 5:
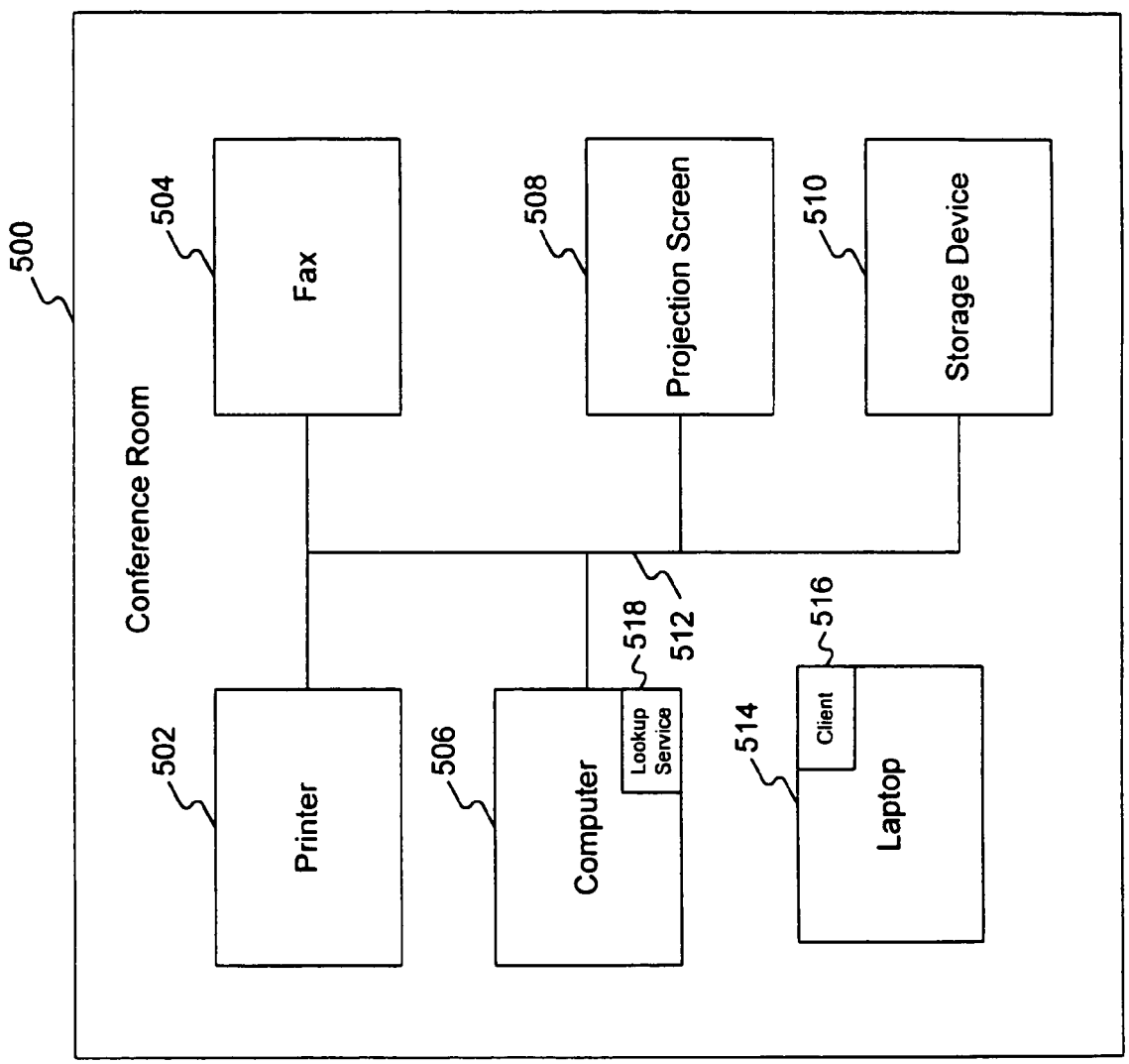
FIG. 5 depicts a conference room containing a number of devices consistent with the present invention.

Described below is an example use of the lookup service 212 with respect to a conference room 500 as depicted in FIG. 5. The conference room 500 contains a printer 502, a fax machine 504, a computer 506, a projection screen 508, and a storage device 510, all interconnected by a network 512. The computer 506 contains a lookup service 518 that defines all services made available by the conference room Djinn. In this example, the user enters the conference room 500 with laptop 514. Such a situation occurs when a user with a laptop enters the conference room 500 for a meeting. If the user wishes to make use of the services provided by various devices in the conference room 500, the user must join the Djinn of the conference room. In order to do so, the user connects the laptop to the network 512 and runs a program, client 516, to perform the boot and join (or discovery) process, as described above. After the completion of the boot and join process, the client 516 (e.g., a browser) receives a reference to the lookup service 518 defining the services provided by the conference room Djinn. Using this reference, the client 516 downloads an applet from the lookup service 518 that displays a screen 600, as shown in FIG. 6.

Figure 6:
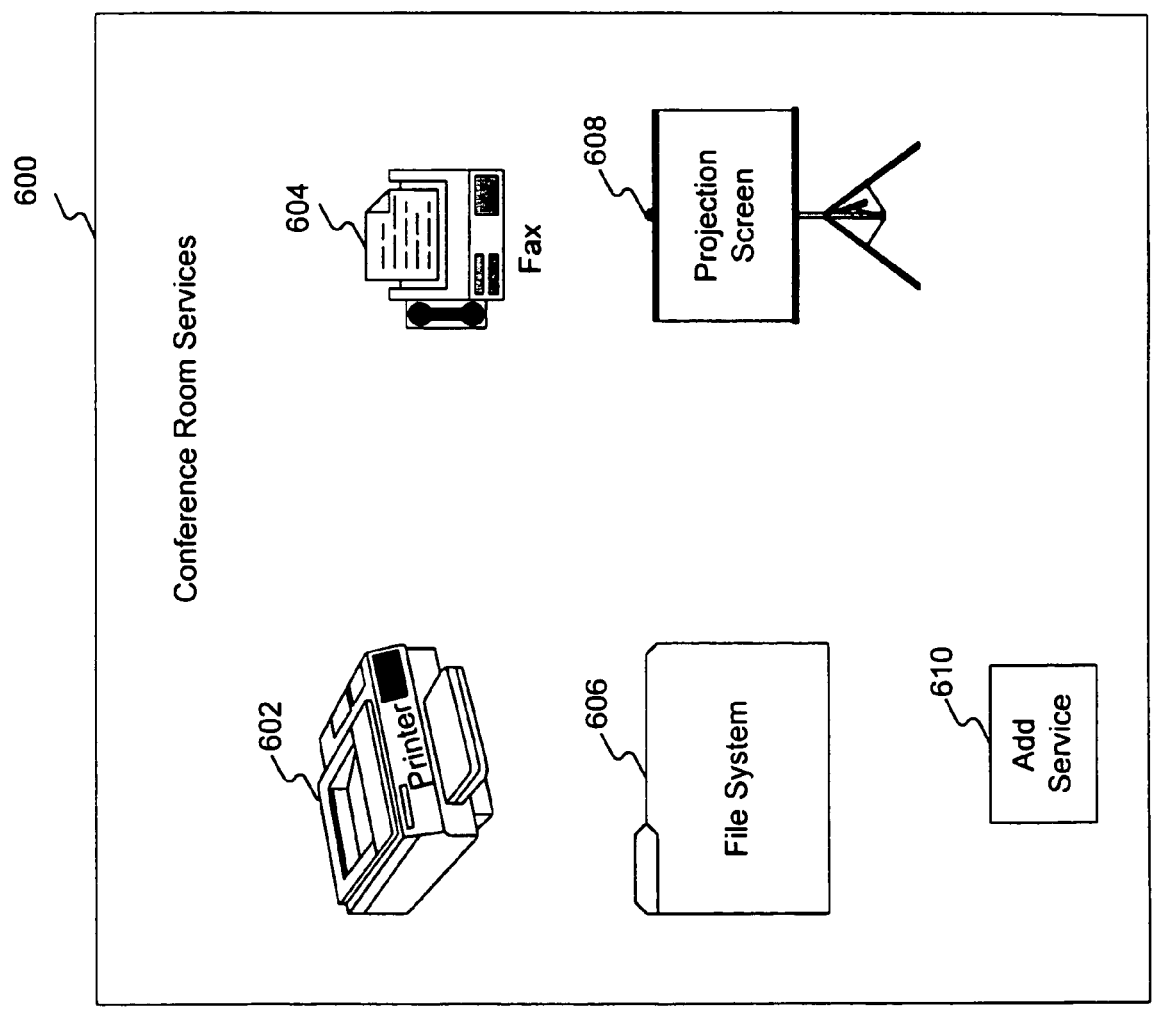
FIG. 6 depicts a screen displaying icons representing services available in the conference room of FIG. 5.

FIG. 6 depicts screen 600 displaying the available services of the lookup service 518 represented as various icons, including a printer 602, a fax 604, a file system 606, and a projection screen 608. The screen 600 also displays an add service button 610. When the printer icon 602 is selected, the stub code (i.e., service item) for the printer is downloaded to the client so that the client may make use of the printer. Similarly, selection of the fax icon 604, the file system icon 606, or the projection screen icon 608 downloads the appropriate stub information so that the client can use those services. The file system icon 606 represents the file system of the computer 506.

Figure 7:
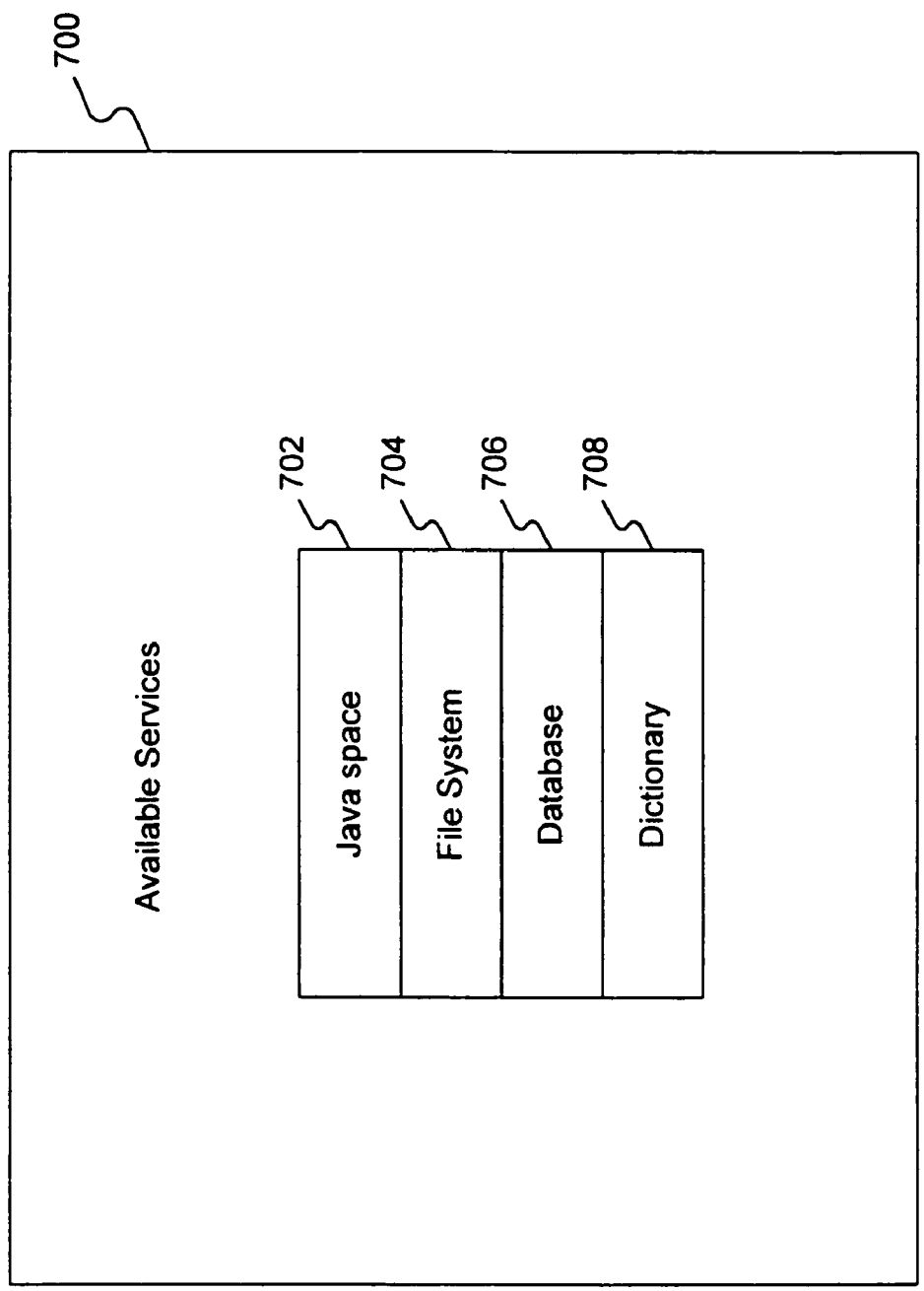
FIG. 7 depicts a screen displaying the available services provided by a computer in the conference room of FIG. 5.

The user, however, may want to add a service and thus selects the add service button 610. Upon selection of the add service button 610, a screen 700 is presented to the user as shown in FIG. 7. The screen 700 depicts the available services of the laptop 514 which the user may add to the Djinn. For example, the available services on the laptop 514 may include a Java space 702, the laptop file system 704, a database 706, and a dictionary 708. The user may select any of these services, which are then automatically added to the lookup service and made available to other users of the Djinn.

Although methods and systems consistent with the present invention have been described with reference to a preferred embodiment thereof, those skilled in the art will know of various changes in form and detail which may be made without departing from the spirit and scope of the present invention as defined in the appended claims.

What is claimed is:

1. A method comprising the steps of:
receiving, at a client lookup manager, from a client computer, a request to access a network service, said client lookup manager having an associated cache, said client computer being an element of a distributed system, said distributed system comprising a plurality of lookup services with associated network services; and
the client look up manager:
searching the associated cache for a service reference associated with an instance of the requested network service;
returning, when said searching step is successful, the instance of the requested network service to the client computer;
sending, when said searching step is unsuccessful, a request for the service reference to a lookup service, said service reference identifying the requested network service, said request including an integer argument representing a desired maximum number of references matching said service reference that should be returned; and
storing said matching references in the associated cache.

2. The method according to claim 1, wherein the searching step further comprises searching a table of the plurality of lookup services and the associated network services for said service reference.

3. A computer-readable storage device containing instructions encoded thereon for a data client lookup manager to implement a method, the method comprising the steps:
receiving, at a client lookup manager, from a client computer, a request to access a network service, said client lookup manager having an associated cache, said client computer being an element of a distributed system, said distributed system comprising a plurality of lookup services with associated network services; and the client look up manager: searching the associated cache for a service reference associated with an instance of the requested network service;
returning, when said searching step is successful, the instance of the requested network service to the client computer;
sending, when said searching step is unsuccessful, a request for the service reference to a lookup service, said service reference identifying the requested network service, said request including an integer argument representing a desired maximum number of references matching said service reference that should be returned; and
storing said matching references in the associated cache.

4. The computer-readable storage device according to claim 3, wherein the searching step further comprises searching a table of the plurality of lookup services and associated network services for the said service reference.

5. A distributed system comprising:
a server computer with a lookup service having references to a plurality of network services; and
a client computer including a client lookup manager with an associated cache, wherein said client lookup manager:
receives, from the client computer, a request to access a network service;
searches the associated cache for a service reference associated with an instance of the requested network service;
returns, when said searching step is successful, the instance of the requested network service to the client computer;
sends, when said searching step is unsuccessful, a request for the service reference to the lookup service, said service reference identifying the requested network service, said request including an integer argument representing a desired maximum number of references matching said service reference that should be returned; and
stores said matching references in the associated cache.

* * * * *

UNITED STATES PATENT AND TRADEMARK OFFICE
CERTIFICATE OF CORRECTION

PATENT NO. : 7,734,747 B2
APPLICATION NO. : 10/669692
DATED : June 8, 2010
INVENTOR(S) : Murphy et al.

Page 1 of 1

It is certified that error appears in the above-identified patent and that said Letters Patent is hereby corrected as shown below:

Title Page, Section (56), Page 7, Column 2, line 26, before ""FAQ", insert --Venners,--.

Signed and Sealed this

Twentieth Day of July, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,734,747 B2 | Page 1 of 1 |
| APPLICATION NO. | : 10/669692 | |
| DATED | : June 8, 2010 | |
| INVENTOR(S) | : Brian T. Murphy et al. | |

It is certified that error appears in the above-identified patent and that said Letters Patent is hereby corrected as shown below:

Title page 5, in column 2, under "Other Publications", line 1, delete "O2" and insert -- $O_2$ --, therefor.

In column 1, line 32, delete ""Method." and insert -- "Method, --, therefor.

In column 1, line 35, delete ""Method." and insert -- "Method, --, therefor.

In column 5, line 18, delete "system By" and insert -- system. By --, therefor.

In column 7, line 23, after "countries" insert -- . --.

In column 12, line 10, delete "(302)." and insert -- (step 302). --, therefor.

In column 12, line 42, delete "of" and insert -- of a --, therefor.

In column 16, line 18, delete "ServicesMatches" and insert -- ServiceMatches --, therefor.

Signed and Sealed this
Twelfth Day of July, 2011

David J. Kappos
*Director of the United States Patent and Trademark Office*